(12) United States Patent
Hyde et al.

(10) Patent No.: US 9,321,424 B2
(45) Date of Patent: Apr. 26, 2016

(54) ENERGY DISSIPATIVE CUSHIONING ELEMENTS

(71) Applicant: Searete LLC, Bellevue, WA (US)

(72) Inventors: Roderick A. Hyde, Redmond, WA (US); Muriel Y. Ishikawa, Livermore, CA (US); Lowell L. Wood, Jr., Belllevue, WA (US)

(73) Assignee: Deep Sciences, LLC, Bellevue, WA (US)

( * ) Notice: Subject to any disclaimer, the term of this patent is extended or adjusted under 35 U.S.C. 154(b) by 0 days.

(21) Appl. No.: 14/297,182

(22) Filed: Jun. 5, 2014

(65) Prior Publication Data

US 2015/0001019 A1 Jan. 1, 2015

Related U.S. Application Data

(63) Continuation of application No. 13/199,442, filed on Aug. 29, 2011, now Pat. No. 8,851,518, and a continuation-in-part of application No. 11/868,416, filed on Oct. 5, 2007, now Pat. No. 8,033,571, and a continuation-in-part of application No. 11/726,706, filed on Mar. 21, 2007, now Pat. No. 8,719,254, and a continuation-in-part of application No. 11/603,965, filed on Nov. 21, 2006, now Pat. No. 8,102,258, and a continuation-in-part of application No. 11/136,339, filed on May 25, 2004, now Pat. No. 7,548,168.

(51) Int. Cl.
*B60R 21/36* (2011.01)
*B60R 21/16* (2006.01)
*B60R 21/2338* (2011.01)
(Continued)

(52) U.S. Cl.
CPC ........... *B60R 21/2338* (2013.01); *B60R 21/013* (2013.01); *B60R 21/0132* (2013.01); *B60R 21/0134* (2013.01); *B60R 21/23* (2013.01); *B60R 21/36* (2013.01); *F16F 7/128* (2013.01); *G05B 15/02* (2013.01); *B60R 2021/01088* (2013.01); *B60R 2021/01325* (2013.01); *B60R 2021/23386* (2013.01)

(58) Field of Classification Search
CPC ........................... B60R 21/2338; B60R 21/36
USPC ................. 280/743.2; 188/371–377; 206/522
See application file for complete search history.

(56) References Cited

U.S. PATENT DOCUMENTS 3,398,406 A   8/1968  Waterbury
3,889,970 A * 6/1975  Astheimer et al. ............ 280/749
(Continued)

FOREIGN PATENT DOCUMENTS

CN      2182147 Y     11/1994
DE      195 41 998 A1  5/1997
(Continued)

OTHER PUBLICATIONS

State Intellectual Property Office of P.R.C.; Notification of First Office Action; App. No. 2008/10100667.3; Jan. 18, 2012.
(Continued)

*Primary Examiner* — Ruth Ilan

(57) ABSTRACT

An apparatus, method, computer program product, and/or system are described that determine an event, actuate a cushioning element in response to the determining the event, the cushioning element including one or more tension-bearing members, and dissipate at least some of an energy associated with a collision based on deforming at least one of the tension-bearing members during the collision, the deforming including substantially inelastically stretching the at least one of the tension-bearing members. Other example embodiments are also provided relating to actuatable cushioning elements.

20 Claims, 21 Drawing Sheets

(51) Int. Cl.

| | |
|---|---|
| B60R 21/0134 | (2006.01) |
| B60R 21/013 | (2006.01) |
| B60R 21/0132 | (2006.01) |
| B60R 21/23 | (2006.01) |
| F16F 7/12 | (2006.01) |
| G05B 15/02 | (2006.01) |
| B60R 21/01 | (2006.01) |

(56) References Cited

U.S. PATENT DOCUMENTS

| | | |
|---|---|---|
| 3,960,386 A | 6/1976 | Wallsten |
| 4,287,250 A | 9/1981 | Rudy |
| 4,817,902 A | 4/1989 | Mason |
| 4,825,625 A | 5/1989 | Hufford |
| 4,875,548 A | 10/1989 | Lorsbach |
| 4,977,623 A | 12/1990 | DeMarco |
| 5,005,240 A | 4/1991 | Vrzalik |
| 5,052,065 A | 10/1991 | West |
| 5,054,811 A | 10/1991 | Unterforsthuber et al. |
| 5,150,767 A | 9/1992 | Miller |
| 5,181,697 A | 1/1993 | Rumer |
| 5,202,831 A | 4/1993 | Blackburn et al. |
| 5,203,427 A | 4/1993 | Williams, Sr. et al. |
| 5,299,397 A | 4/1994 | Ahern |
| 5,308,113 A | 5/1994 | Moriset |
| 5,362,098 A | 11/1994 | Guill |
| 5,372,429 A | 12/1994 | Beaver, Jr. et al. |
| 5,478,114 A | 12/1995 | Maurer et al. |
| 5,592,705 A | 1/1997 | West |
| 5,803,263 A | 9/1998 | Pozzo |
| 5,810,385 A | 9/1998 | Henseler et al. |
| 5,879,767 A | 3/1999 | Matsushima et al. |
| 5,881,407 A | 3/1999 | Chu Pt |
| 5,937,443 A | 8/1999 | Kageyama et al. |
| 5,945,912 A | 8/1999 | Guldbrand |
| 5,960,494 A | 10/1999 | Gilliland et al. |
| 6,125,478 A | 10/2000 | Alaloof |
| 6,139,052 A | 10/2000 | Preamprasitchai |
| 6,160,478 A | 12/2000 | Jacobsen et al. |
| 6,181,998 B1 | 1/2001 | Kanameda et al. |
| 6,219,605 B1 | 4/2001 | Bauer et al. |
| 6,231,075 B1 | 5/2001 | Otsu |
| 6,233,761 B1 | 5/2001 | Neff |
| 6,314,596 B1 | 11/2001 | Neff |
| 6,341,473 B1 | 1/2002 | Kovacs et al. |
| 6,359,568 B1 | 3/2002 | Johnson |
| 6,371,510 B1 | 4/2002 | Marriott et al. |
| 6,382,660 B1 | 5/2002 | Starner et al. |
| 6,396,427 B1 | 5/2002 | Mattes et al. |
| 6,419,262 B1 | 7/2002 | Fendt et al. |
| 6,447,006 B1 | 9/2002 | Hess et al. |
| 6,594,835 B2 | 7/2003 | West |
| 6,766,535 B2 | 7/2004 | Duhamell et al. |
| 6,769,571 B2 | 8/2004 | Mino |
| 6,792,342 B2 | 9/2004 | Breed et al. |
| 6,848,708 B2 | 2/2005 | Green et al. |
| 6,964,451 B1 | 11/2005 | Bergey |
| 7,017,195 B2 | 3/2006 | Buckman et al. |
| 7,018,495 B2 | 3/2006 | Kannankeril et al. |
| 7,025,376 B2 | 4/2006 | Dominissini |
| 7,032,924 B2 | 4/2006 | Brewster et al. |
| 7,209,221 B2 | 4/2007 | Breed et al. |
| 7,267,367 B2 | 9/2007 | Barvosa-Carter et al. |
| 7,320,379 B2 | 1/2008 | Gila et al. |
| 7,354,410 B2 | 4/2008 | Perry et al. |
| 7,356,358 B2 | 4/2008 | Sakai |
| 7,409,735 B2 | 8/2008 | Kramer et al. |
| 7,444,698 B2 | 11/2008 | Jackson, III |
| 7,481,453 B2 | 1/2009 | Breed |
| 7,506,892 B2 | 3/2009 | Klinkenberger et al. |
| 7,548,168 B2 | 6/2009 | Ishikawa et al. |
| 7,806,221 B2 | 10/2010 | Mishra |
| 7,984,939 B2 | 7/2011 | Vodavoz |
| 8,102,258 B2 | 1/2012 | Hyde et al. |
| 2001/0049840 A1 | 12/2001 | Atanasio |
| 2002/0124882 A1 | 9/2002 | Russo |
| 2002/0179390 A1 | 12/2002 | Kitano et al. |
| 2003/0114972 A1 | 6/2003 | Takafuji et al. |
| 2004/0049331 A1 | 3/2004 | Schneider |
| 2005/0100251 A1 | 5/2005 | Havens et al. |
| 2005/0154530 A1 | 7/2005 | Hosokawa et al. |
| 2006/0131202 A1 | 6/2006 | Kramer |
| 2006/0169753 A1 | 8/2006 | Piucci et al. |
| 2006/0267779 A1 | 11/2006 | Ishikawa et al. |
| 2007/0036947 A1 | 2/2007 | Barwick |
| 2007/0182144 A1 | 8/2007 | Aranzulla et al. |
| 2007/0205590 A1 | 9/2007 | Klinkenberger et al. |
| 2008/0083640 A1 | 4/2008 | Liu |
| 2008/0117042 A1 | 5/2008 | Hyde et al. |
| 2008/0143521 A1 | 6/2008 | Hyde et al. |
| 2008/0251332 A1* | 10/2008 | Stuhmiller et al. ...... 188/322.16 |
| 2008/0307553 A1* | 12/2008 | Jbeili et al. .......................... 2/2.5 |
| 2009/0261959 A1 | 10/2009 | Hyde et al. |
| 2010/0004567 A1 | 1/2010 | Ishikawa et al. |
| 2010/0004819 A1 | 1/2010 | Katz et al. |

FOREIGN PATENT DOCUMENTS

| | | |
|---|---|---|
| DE | 19631739 A1 | 2/1998 |
| JP | 2005-262994 A | 9/2005 |

OTHER PUBLICATIONS

The State Intellectual Property Office of P.R.C.; Notification of the Second Chinese Office Action; Chinese App.: 200810100667.3; Oct. 30, 2012; pp. 1-9 (5 pages Machine English Translation).

The State Intellectual Property Office of the People's Republic of China; Notification of the Third Office Action; App. No. 200810100667.3; Apr. 3, 2013; 11 total pages (6 pages Chinese Office Action, 5 pages English translation).

"Frequently Asked Questions About Zylon and Body Armor, Written and Distributed by Toyobo Co., Ltd."; 2007; pp. 1-11; Osaka, Japan.

"Pro Fiber ZYLON®"; Toyobo Co., Ltd.; Technical Information (Revised Sep. 2001); bearing a date of Sep. 1, 2001; pp. 1-18; Osaka, Japan.

"Toyobo Material Safety Data Sheet", Toyobo Co., Ltd.; First issue: Aug. 10, 2000; Revised: Oct. 25, 2000; Material Safety Data Sheet No. F0374K; bearing a date of Oct. 25, 2000; pp. 1-3.

Davis, Ph.D., Warren; "What is a Tensor?"; located at www.Physlink.com/Education/AskExperts/ae168.cfm; pp. 1-2; printed on Dec. 14, 2004.

Feliciano-Diaz, Xiomara "Geriatric Fall Hip Injury Prevention Device (Personal airbag system to prevent hip fractures on geriatrics)"; NSF Summer Undergraduate Fellowship in Sensor Technologies; located at www.ee.unenn.edu/~sunfest/pastProjects/Papers00/DiazXiomara.pdf, pp. 44-65.

Knight, Will; "Smart Sports Shoe Adapts for Optimal Cushioning"; located at www.newscientist.com/news/print.jsQ?id=ns99994969; bearing a date of May 6, 2004; pp. 1; printed on Dec. 7, 2004.

Nagourney, Eric; "Aging: Hip Protectors Don't Help Prevent Fractures in Falls"; The New York Times; bearing a date of Aug. 7, 2007; p. 1; The New York Times Company; printed on Aug. 9, 2007.

Will, S. ; "Investigations by Mehler on the PBO-Fiber Zylon® from Toyobo"; Toyobo Co., Ltd. Mehler R&D, Osaka, Japan; bearing a date of May 7, 2002; pp. 1-5.

"Meta-Aramid Fiber"; (Jan. 25, 2008).

* cited by examiner

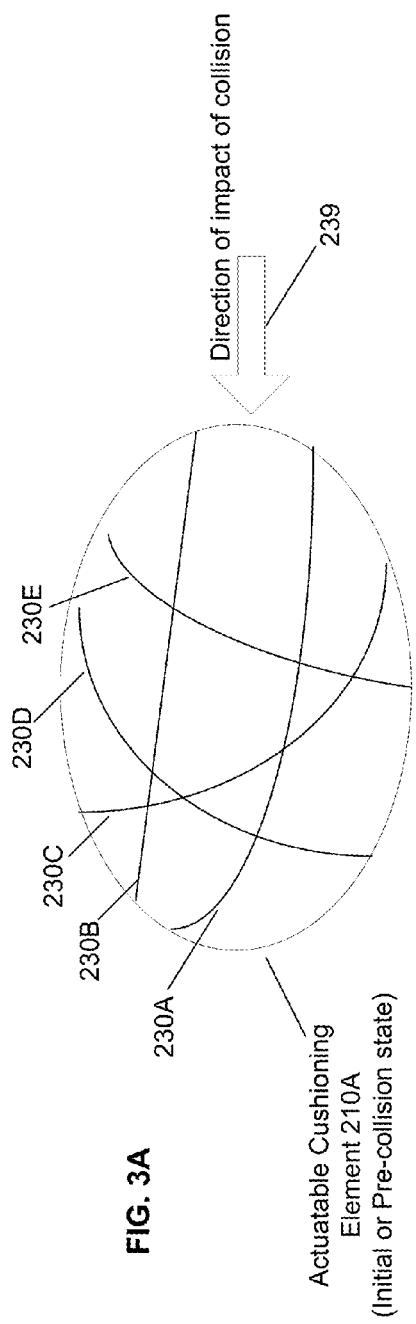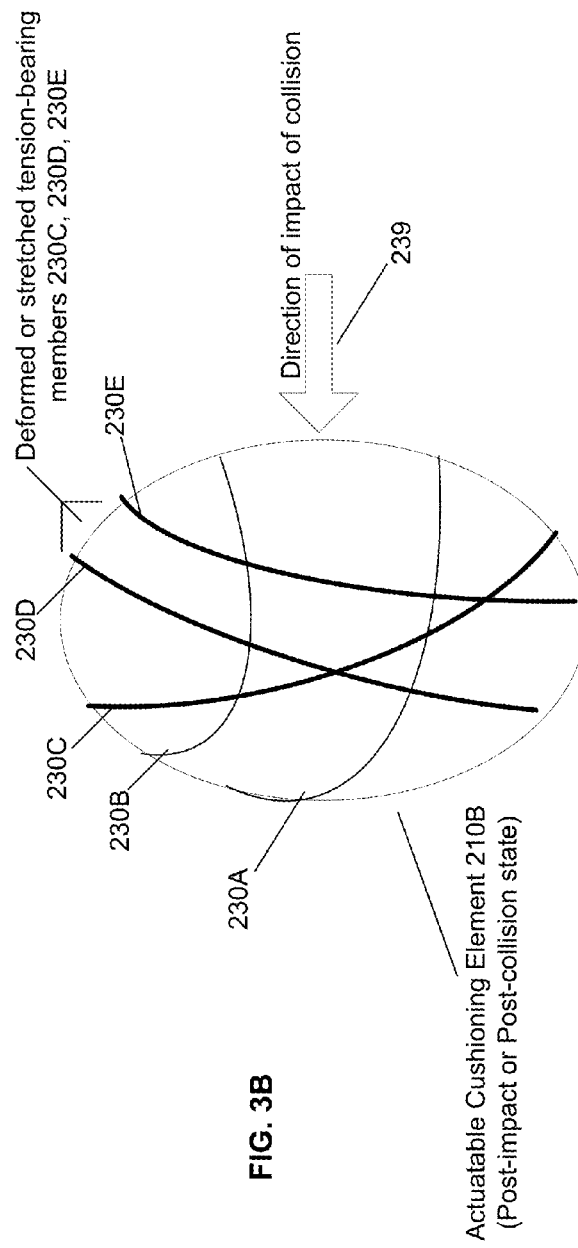
FIG. 3A
FIG. 3B

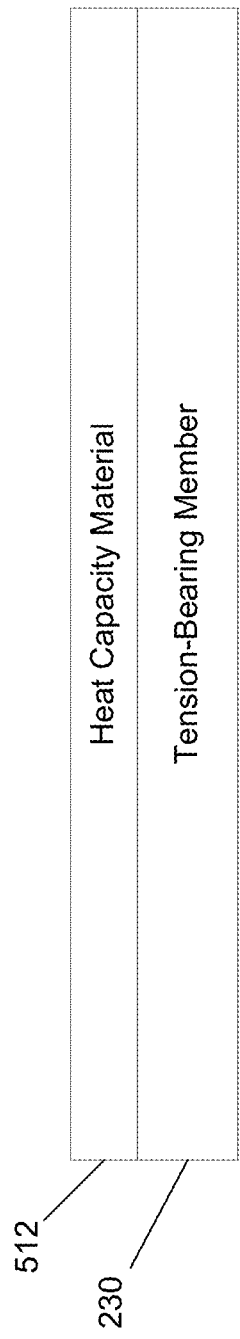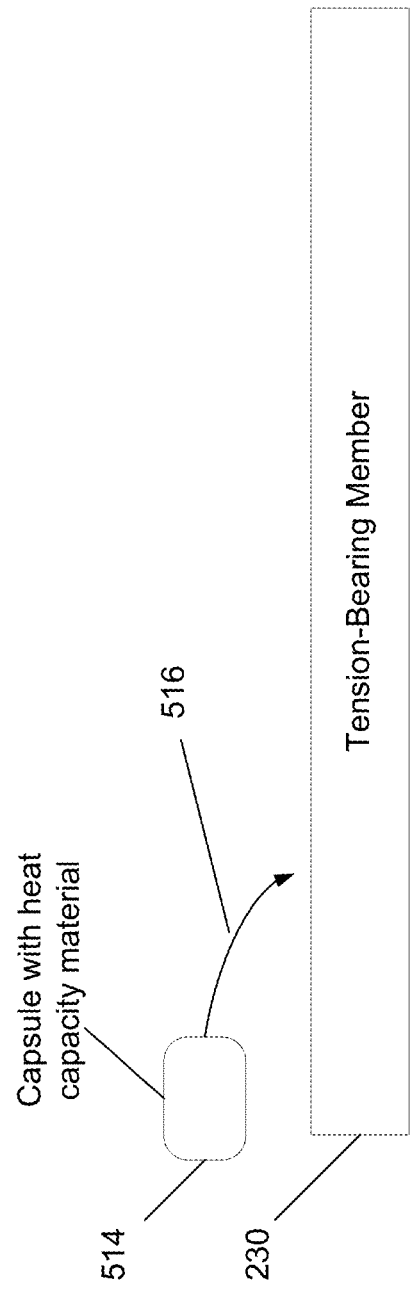

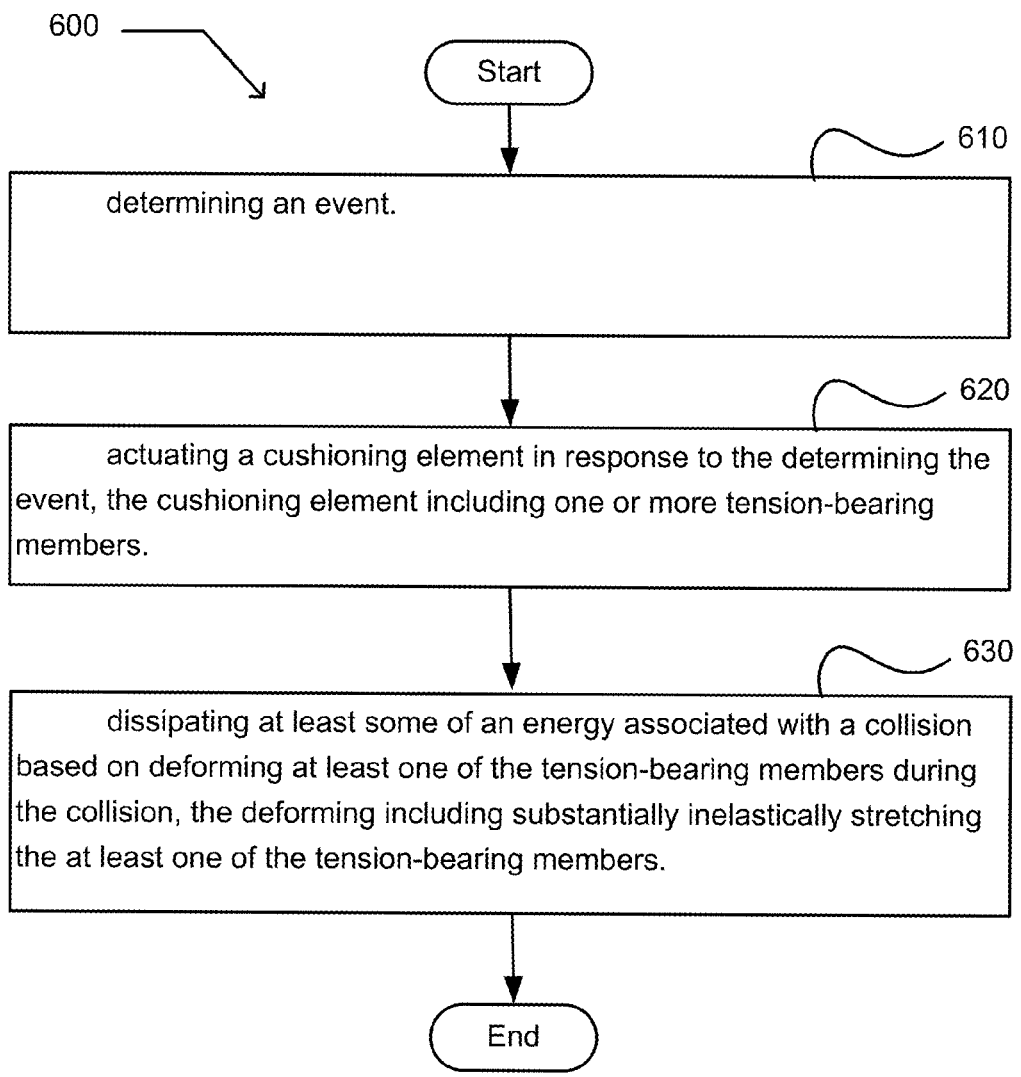

FIG. 18

System

1810 A computing device

1812 One or more of a personal digital assistant (PDA), a laptop computer, a tablet personal computer, a networked computer, a computing system comprised of a cluster of processors, a workstation computer, and/or a desktop computer.

1820 One or more instructions that when executed on the computing device cause the computing device to:
(a) determine an event;
(b) actuate a cushioning element in response to the determining the event, the cushioning element including one or more tension-bearing members; and
(c) provide control sufficient to dissipate at least some of an energy associated with a collision based on deforming at least one of the tension-bearing members during the collision, the deforming including substantially inelastically stretching the at least one of the tension-bearing members.

FIG. 19

Apparatus

1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

1912 A cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit.

1922 A heat capacity material associated with at least one of the tension-bearing members.

1924 A heat capacity material in contact with at least one of the one or more tension-bearing members to increase a work capacity of the at least one of the one or more tension-bearing members.

1930 An element controller configured to control the cushioning element.

1940 An event detector coupled to the element controller configured to detect an event.

FIG. 20

Apparatus

1900

1910 A cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation.

2002 Wherein at least one of the one or more tension-bearing members comprises one or more polyaramid fibers.

2004 Wherein one or more of the tension-bearing members comprises at least one of a graphitic fiber, a carbon fiber, and/or natural fibers.

2006 Wherein one or more of the tension-bearing members comprises at least one of a poly-benzobisoxazole fiber, and/or a synthetic fiber.

2008 Wherein at least one of the one or more tension-bearing members lies on a surface of the cushioning element.

2010 Wherein at least one of the one or more tension-bearing members lies within an interior portion of the cushioning element.

2012 Wherein at least some of the tension-bearing members have different tension properties than other tension-bearing members.

ENERGY DISSIPATIVE CUSHIONING ELEMENTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/868,416 entitled ENERGY DISSIPATIVE CUSHIONING SYSTEM, naming Muriel Y. Ishikawa, Edward K.Y. Jung, Cameron A. Myhrvold, Conor L. Myhrvold, Nathan P. Myhrvold, Lowell L. Wood, Jr. and Victoria Y.H. Wood, as inventors, filed Oct. 5, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/199,442 entitled ENERGY DISSIPATIVE CUSHIONING SYSTEM, naming Muriel Y. Ishikawa, Edward K.Y. Jung, Cameron A. Myhrvold, Conor L. Myhrvold, Nathan P. Myhrvold, Lowell L. Wood, Jr. and Victoria Y.H. Wood, as inventors, filed Aug. 29, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/136,339 entitled WEARABLE/PORTABLE PROTECTION FOR A BODY, naming Muriel Y. Ishikawa, Edward K. Y. Jung, Cameron A. Myhrvold, Conor L. Myhrvold, Nathan P. Myhrvold, Lowell L. Wood, Jr. and Victoria Y. H. Wood, as inventors, filed May 24, 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/603,965 entitled ACTUATABLE CUSHIONING ELEMENTS, naming Muriel Y. Ishikawa, Edward K. Y. Jung, Cameron A. Myhrvold, Conor L. Myhrvold, Nathan P. Myhrvold, Lowell L. Wood, Jr. and Victoria Y. H. Wood, as inventors, filed Nov. 21, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/726,706 entitled ACTUATABLE CUSHIONING ELEMENTS, naming Muriel Y. Ishikawa, Edward K. Y. Jung, Cameron A. Myhrvold, Conor L. Myhrvold, Nathan P. Myhrvold, Lowell L. Wood, Jr. and Victoria Y. H. Wood, as inventors, filed Mar. 21, 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent that such subject matter is not inconsistent herewith.

SUMMARY

An embodiment provides a method. In one implementation, the method includes but is not limited to: determining an event; actuating a cushioning element in response to the determining the event, the cushioning element including one or more tension-bearing members; and dissipating at least some of an energy associated with a collision based on deforming at least one of the tension-bearing members during the collision, the deforming including substantially inelastically stretching the at least one of the tension-bearing members. In addition to the foregoing, other method aspects are described in the claims, drawings, and text forming a part of the present disclosure.

An embodiment provides a computer program product. In one implementation, the computer program product includes but is not limited to a signal bearing medium bearing one or more instructions for determining an event; the signal bearing medium also bearing one or more instructions for actuating a cushioning element in response to the determining the event, the cushioning element including one or more tension-bearing members; and the signal bearing medium bearing one or more instructions for providing control sufficient to cause dissipation of at least some of an energy associated with a collision based on deforming at least one of the tension-bearing members during the collision, the deforming including substantially inelastically stretching the at least one of the tension-bearing members. In addition to the foregoing, other computer program product aspects are described in the claims, drawings, and text forming a part of the present disclosure.

An embodiment provides a system. In one implementation, the system includes but is not limited to: a computing device, and one or more instructions that when executed on the computing device cause the computing device to: determine an event; actuate a cushioning element in response to the determining the event, the cushioning element including one or more tension-bearing members; and provide control sufficient to dissipate at least some of an energy associated with a collision based on deforming at least one of the tension-bearing members during the collision, the deforming including substantially inelastically stretching the at least one of the tension-bearing members. In addition to the foregoing, other system aspects are described in the claims, drawings, and text forming a part of the present disclosure.

An embodiment provides an apparatus. In one implementation, the apparatus includes but is not limited to: a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. In addition to the foregoing, other apparatus aspects are described in the claims, drawings, and text forming a part of the present disclosure.

An embodiment provides a method. In one implementation, the method includes but is not limited to constructing a cushioning element including one or more tension-bearing members, at least one of the one or more tension-bearing members being configured to stretch during a collision, including being configured to stretch beyond an elastic limit, to dissipate at least some of a kinetic energy associated with the collision. In addition to the foregoing, other method aspects are described in the claims, drawings, and text forming a part of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE DRAWINGS

FIG. 3A illustrates an actuatable cushioning element according to another example embodiment.

FIG. 3B illustrates an actuatable cushioning element of FIG. 3A in a post-collision state according to an example embodiment.

FIG. 5A is a diagram illustrating a tension-bearing member according to an example embodiment.

FIG. 5B is a diagram illustrating a tension-bearing member according to another example embodiment.

FIG. 6 illustrates an operational flow representing example operations related to actuatable energy dissipative cushioning elements according to an example embodiment.

FIG. 18 illustrates an example system 1800.

FIG. 19 illustrates an example apparatus 1900 in which embodiments may be implemented.

FIG. 20 also illustrates alternative embodiments of the example apparatus 1900.

The use of the same symbols in different drawings typically indicates similar or identical items.

DETAILED DESCRIPTION

Figure 1:
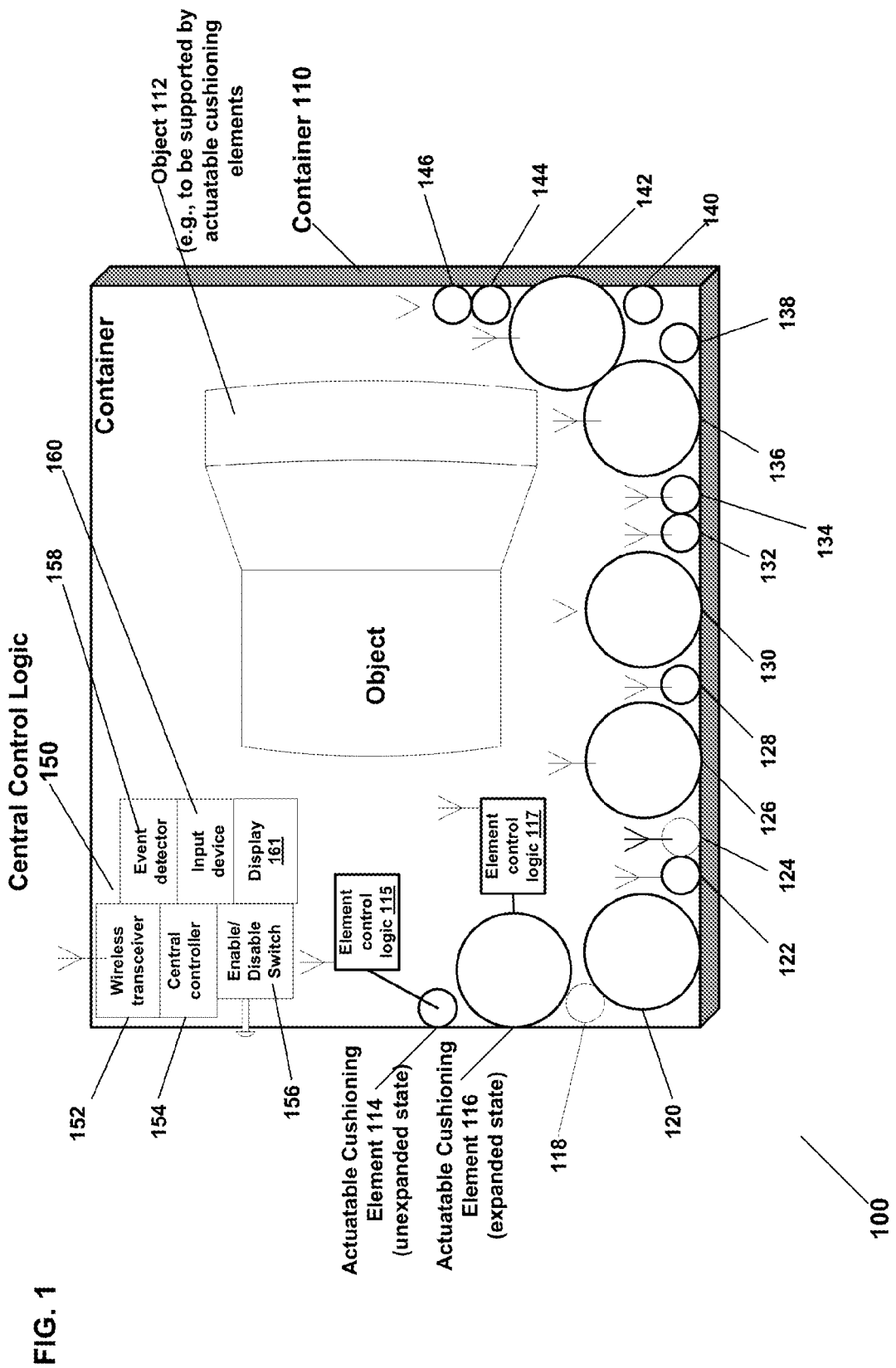
FIG. 1 illustrates an example system in which embodiments may be implemented.

FIG. 1 illustrates an example system 100 in which embodiments may be implemented. System 100 may include, for example, a container 110, which may be any type of container, such as a box, a container for shipping cargo on a vehicle, boat, plane, train or other vehicle, a container for shipping or storing small or large items, a container for shipping fragile items, or any other container. Container 110 may be made from any suitable material, such as cardboard, plastic, steel, etc., as a few example materials, but any type of material may be used.

System 100 may also include one or more actuatable cushioning elements provided within container 110, such as actuatable cushioning elements 114, 116, 118, 120, 122, 124, 126, 128, 130, 132, 134, 136, 138, 140, 142, 144, 146, etc. The actuatable cushioning elements may provide cushioning support for an item or object, such as object 112, for example. Object 112 may be any type of object, such as electronics, books, food items, a vehicle (e.g., automobile, boat, train, plane), cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 114, 116, etc. may spread a force or interaction of an object over a period of time or over an area within container 110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment. Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto. Additional details and example embodiments are described herein.

Actuatable cushioning elements 114, 116, etc. may be in either an expanded state, such as shown for actuatable cushioning element 116, or an unexpanded state such as for actuatable cushioning element 114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples. Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 114, 116, etc. may include any type of expandable element. For example, actuatable cushioning elements 114, 116, etc., may include expandable gas bags which may expand based on the application of pressurized gas to the bag similar to the airbags used in automobiles and other vehicles. Actuatable cushioning elements 114, 116, etc. may alternatively include a fluid-expandable bag or entity that may be expanded by fluid. For example, actuatable cushioning elements 114, 116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, actuatable cushioning elements 114, 116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 114, 116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of actuatable cushioning elements 114, 116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event. These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, inform the system 100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 1 again, in an example embodiment, system 100 may include central control logic 150, including a central controller 154 which may provide overall control for system 100. Central control logic 150 may include a number of additional blocks coupled to central controller 154, which will be briefly described.

A wireless receiver 152 may transmit and receive wireless signals such as RF (radio frequency) signals. Wireless signals such as RF signals may include any wireless or other electromagnetic signals, and are not limited to any particular frequency range.

An event detector 158 may detect or determine an event (or condition), or a series of events, such as an acceleration or change in acceleration that exceeds a threshold, a temperature that reaches a specific temperature, a location that is within a specific distance of a selected location, or any other event. Event detector 158 may include any type of detector or sensor. Event detector 158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 158 may include a Ring Laser Gyro, a Fiber Optic Gyro, a Vibrating Structure Gyro, a MEMS Gyro, or a mechanical gyroscope.

Or, alternatively for event detector 158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

Event detector 158 may also, for example, include a GPS receiver, a speedometer, an accelerometer, Radar, a camera, a Gyro, or any other sensor or device that may allow the detection of one or more of the following: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. The first and second objects in this example may be any type of objects. For example, the detected event or information (e.g., relative location, velocity, acceleration, orientation, angular velocity, angular acceleration) may indicate that a collision between a first object (such as a vehicle) and a second object (e.g., another vehicle, a tree, a railing . . . ) has occurred or is likely to occur.

An enable/disable switch 156 may be used to enable or disable system 100. For example, enable/disable switch 156 may be used to enable the one or more actuatable cushioning elements to be actuated, or may disable the one or more actuatable cushioning elements from being actuated, for example. System 100 may also include an input device, such as a mouse, keypad or other input device, which may allow a user to configure operation of system 100, for example. For example, enable/disable switch 156 and/or input device 160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 161 may also be provided to display information. Input device 160 and display 161 may be provided in a position which may be reached or accessed by a user, such as on the outside of the container 110, for example.

One or more of the actuatable cushioning elements may include an element control logic to control overall operation and/or actuation of the element(s) to which the control logic is connected. For example, element control logic 115 may provide control to actuatable cushioning element 114, while element control logic 117 may control operation of actuatable cushioning element 116.

An element control logic may control a single actuatable cushioning element, or may control multiple cushioning elements, for example. The element control logic for one or more actuatable cushioning elements may communicate with other element control logic to provide a cushioning support for object 112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 154 (FIG. 1) of central control logic 150 may provide central control for operation of the one or more actuatable cushioning elements within container 110. For example, event detector 158 may detect an event, and then wireless transceiver 152 (e.g., under control of central controller 154) may transmit wireless signals to one or more element control logic (e.g., 115, 117, . . . ) to cause one or more actuatable cushioning elements to actuate in response to the event.

Figure 2:
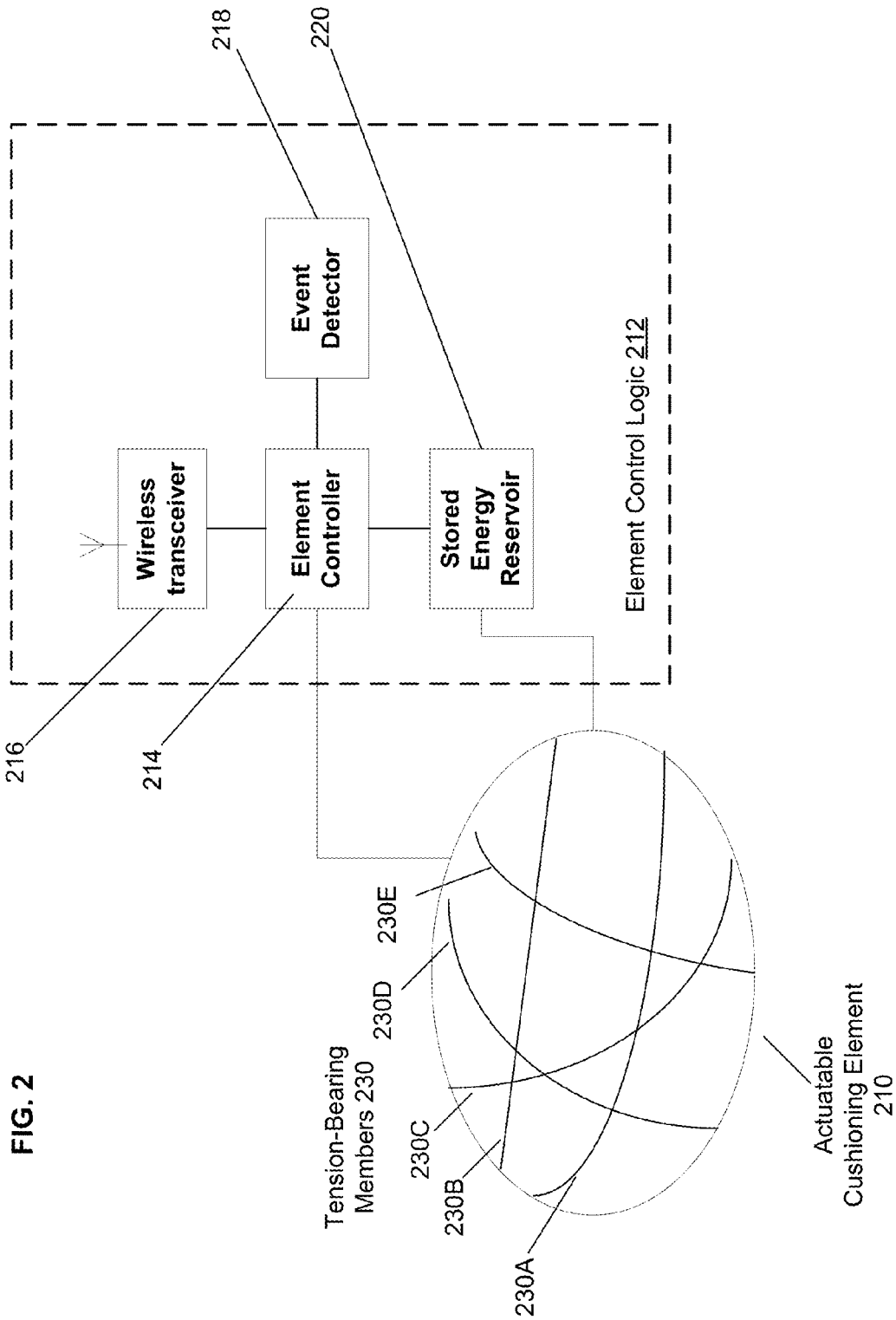
FIG. 2 illustrates an actuatable cushioning element according to an example embodiment.

FIG. 2 illustrates an actuatable cushioning element according to an example embodiment. An actuatable cushioning element 210 may be coupled to (or may include) an associated element control logic 212. Although not shown, one or more of the actuatable cushioning elements (e.g., actuatable cushioning elements 114, 116, 118, 120, 122, 124, . . . ) may each include a similar element control logic. For example, element control logic 115 and 117 may be the same as or similar to element control logic 212, for example. In an alternative embodiment, element control logic 212 may be omitted.

Element control logic 212 may include an element controller 214 to provide overall control for an actuatable cushioning element 210. An event detector 218 may detect or determine an event. Event detector 218 may be, for example, the same as or similar to the event detector 158. A wireless transceiver 216 may transmit and receive wireless signals. Alternatively, actuatable cushioning elements may be coupled together (and/or to central control logic 150) via any communications media, such as a wireless media (e.g., via RF or other electromagnetic signals, acoustic signals), a wired communication media, such as cable, wire, fiber optic line, etc., or other media.

A stored energy reservoir 220 may store gas, liquid, energy (chemical or electrical energy or the like) or other energy or substance, which may be used to actuate actuatable cushioning element 210. For example, stored energy reservoir 220 may receive signals from element controller 214, causing stored energy reservoir 220 to release pressurized liquid or gas to actuatable cushioning element 210 to cause element 210 to expand or inflate, or may release a chemical or other substance causing an expandable cushioning material to expand, for example. In an example embodiment, actuatable cushioning element 210 may include one or more fluid-actuatable elements, where fluid may be sourced from one or more fluid reservoirs (such as from stored energy reservoir 220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 210, may be coupled to an element controller (e.g., element controller 214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where one or more of the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects. This commanded actuation process may be performed by a joint decision process, by a hierarchical process, by a master-slave process, or by other means.

In an example embodiment, the actuatable cushioning element may include one or more tension-bearing members 230, such as tension bearing members 230A, 230B, 230C, 230D and 230E. Tension-bearing members 230 may, for example, bear tension or force, and may deform in one or more ways, and/or may stretch, e.g., during a collision or impact to dissipate energy associated with a collision and/or provide cushioning support for an object. The tension-bearing members 230 may be provided in a number of different directions, and may, for example, lie on a surface (e.g., interior or exterior surface) of the cushioning element 210. Alternatively, one or more of the tension-bearing members 230 may be provided within an interior portion of the cushioning element 210.

In an example embodiment, one or more of the tension-bearing members 230 may deform during a collision between two objects. This deformation of one or more of the tension-bearing members 230 may include, for example, stretching of the tension-bearing member(s). The deforming or stretching, may include, for example, at least a portion of one or more tension-bearing members substantially inelastically stretching after the tension-bearing member has reached an elastic limit.

In an example embodiment, the actuatable cushioning element 210 may dissipate at least some of an energy (e.g., kinetic energy) associated with a collision based on a deforming or stretching of one or more of the tension-bearing members 230. For example, during a collision, at least one tension-bearing member that extends in a direction other than a direction of impact of the collision may stretch beyond an elastic limit, and dissipate at least some of an energy associated with the collision. For example, a tension-bearing member that extends in a direction that is substantially perpendicular to a direction of impact of the collision may stretch or deform during the collision to dissipate energy or provide cushioning support for an object.

By stretching or deforming, the tension-bearing members 230 may perform work or have work performed on them, allowing the dissipation of at least some energy associated with a collision. In this manner, the cushioning element 210 and associated tension-bearing member(s) 230 may, for example, provide cushioning support during a collision for an object or objects, such as a vehicle, person, or other object.

The tension-bearing members may be made of a variety of different materials, and may, for example, have a relatively high tensile strength and/or a high strength to weight ratio. In an example embodiment, tension-bearing members may be provided as one or more polyaramid fibers (also known as aramid or aromatic polyamide fibers). Polyaramid fibers may be a class of heat-resistant and high-strength synthetic fibers, such as for example, fibers in which the fiber-forming substance may be a long-chain synthetic polyamide in which at least some of the amide linkages (—CO—NH—) are attached directly to two aromatic rings. Polyaramid fibers have been manufactured under a number of different brand names, and have been used in a number of different aerospace and military applications, such as ballistic rated body armor, for example.

Polyaramid fiber(s) are merely one example of a tension-bearing member. Tension bearing members 230 may be made from other material (e.g., which may have relatively high tensile strength) that may perform work (or may allow work to be performed on the fiber or member), e.g., through stretching or deforming, or otherwise may provide cushioning or dissipation of energy associated with a collision or other impact. Yet more specific instances of such materials might include at least one of a graphitic fiber, a carbon fiber, and/or a natural fiber. Yet more specific instances of such material might also include at least one of a poly-benzobisoxazole fiber and/or a synthetic fiber. In some instances of such materials, the various fiber types referred to herein are hybridized and/or combined.

FIG. 3A illustrates an actuatable cushioning element according to another example embodiment. Actuatable cushioning element 210A is shown in an initial or pre-collision state. Actuatable cushioning element 210A may include one or more tension-bearing members, including tension-bearing members 230A, 230B, 230C, 230C, 230D and/or 230E. In an example embodiment, a controller, such as central controller 154 or element controller 214 may control or cause the actuation of the actuatable cushioning element into an initial or pre-collision state (e.g., in response to detecting or determining an event). A direction of impact 239 of a collision is shown. Tension-bearing members 230A and 230B, at least in part, may be considered to extend in a direction that may be substantially in a direction of the impact of collision 239. Other tension-bearing members may extend in other directions. For example, tension-bearing members 230C, 230D and 230E may be considered to extend in directions other than the direction of impact of the collision 239. For example, one or more tension-bearing members, such as tension-bearing member 230E, may extend in a direction that may be approximately (or substantially) perpendicular to the direction of impact of the collision 239.

FIG. 3B illustrates an actuatable cushioning element of FIG. 3A in a post-collision state according to an example embodiment. In an example embodiment, during a collision between two objects, the actuatable cushioning element 210 may provide cushioning support for an object (not shown) or dissipate energy associated with the collision via a deforming or stretching of one or more of the tension-bearing members. For example, tension-bearing members 230C, 230D and 230E may deform or stretch during a collision and dissipate energy associated with a collision.

Figure 4:
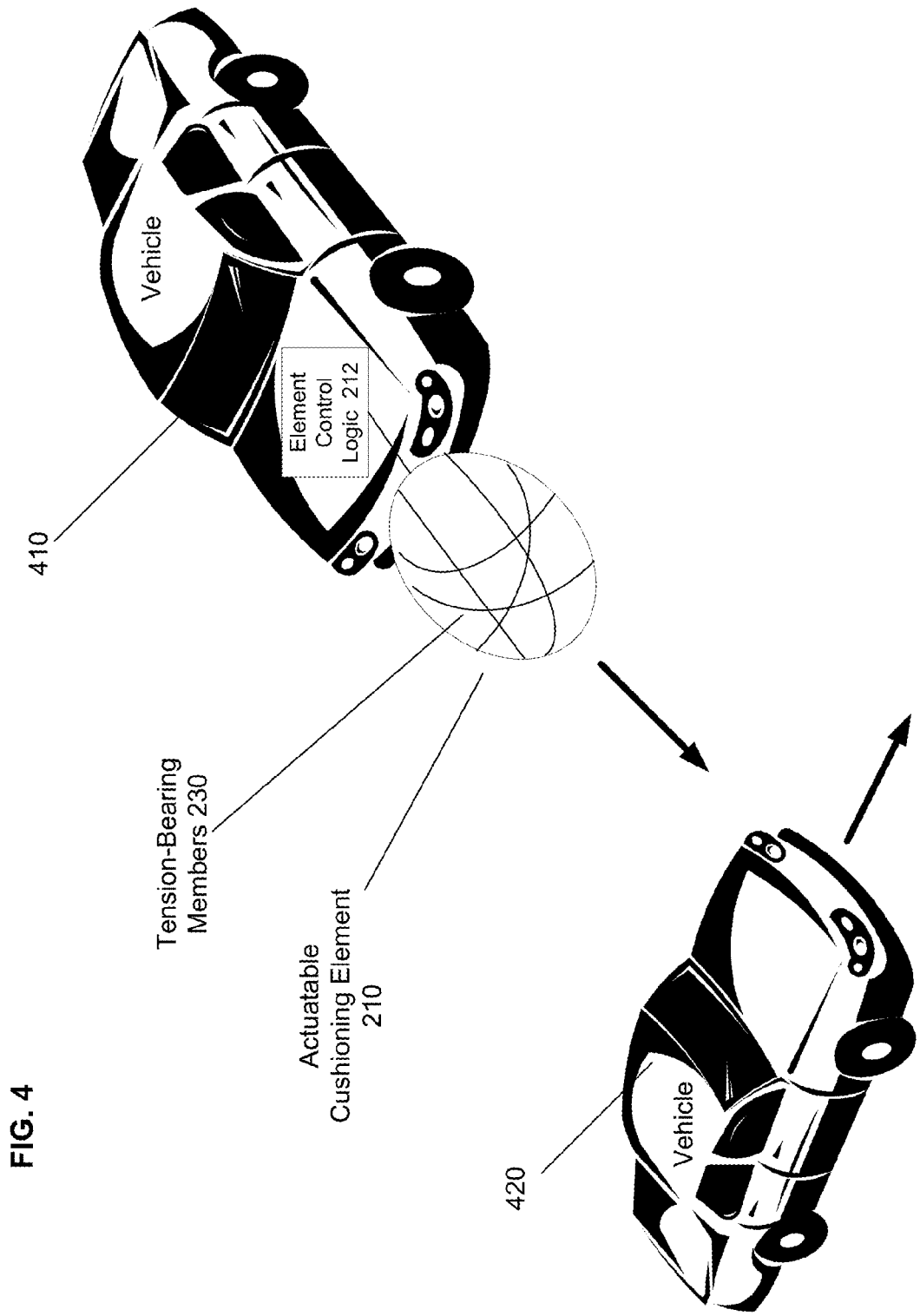
FIG. 4 is a diagram illustrating an operation of an actuatable energy dissipative cushioning element according to an example embodiment.

FIG. 4 is a diagram illustrating an operation of an actuatable energy dissipative cushioning element according to an example embodiment. Two objects are shown in FIG. 4, including vehicle 410 and vehicle 420, although any type of objects may be used. Vehicle 410 may include an actuatable cushioning element 210 that includes one or more tension-bearing members 230. An element control logic 212 may be coupled to the actuatable cushioning element. Event detector 218 of element control logic 212 (FIG. 2) may determine or detect an event, and element controller or central controller 154 may actuate and/or otherwise control actuatable cushioning element 210 and/or tension-bearing members 230 to dissipate energy associated with a collision between vehicle 410 and vehicle 420. Event detector 218 and/or element control logic 212 may detect or determine a number of different events, and may then actuate or deploy the actuatable cushioning element 210. Actuatable cushioning element 210 is shown as being provided outside of vehicle 410, but may be located anywhere, such as inside a cabin or driver's space of vehicle 410, for example.

FIG. 5A is a diagram illustrating a tension-bearing member according to an example embodiment. In an example embodiment, a tension-bearing member 230 may stretch or deform during a collision to dissipate some of the kinetic energy associated with a collision. This may be performed by, for example, at least in part converting some of the kinetic energy associated with the collision into thermal energy. In an example embodiment, tension-bearing member 230 may include a heat capacity material 512 associated with the tension-bearing member 230 to absorb at least some of the thermal energy associated with the collision, or to increase a capacity of the tension-bearing member 230 to perform work or to increase a capacity to have work done on the tension-bearing member 230.

For example, the heat capacity material may increase the temperature at which the tension-bearing member fails or breaks, thereby, at least in some cases increasing the capacity of the tension-bearing member 230 to perform work or stretch during a collision. This may, for example, increase an amount of kinetic energy that the actuatable cushioning element may dissipate during a collision between two objects.

Although not required, in an example embodiment, heat capacity material 512 may use (or may include) a phase-change material that may change phases (e.g., solid-to-liquid, liquid-to-gas, solid-to-gas) while the tension-bearing member is performing work or is stretching or deforming, which may, for example, increase the amount of kinetic energy that the cushioning element may dissipate. This may include, for example, a liquid or other heat capacity material boiling or changing from liquid to gas to dissipate additional energy associated with the collision. For example, water may be used to cool or decrease the temperature of the tension-bearing member during a collision. Thus, using a tension-bearing member having a heat capacity material may increase the temperature at which the tension-bearing member may fail or no longer be able to perform work. Thus, heat capacity material or phase change material may be used to increase or enhance mechanical performance of the tension bearing member 230, for example.

In one example embodiment, if phase change is used, the phase change of the heat capacity material may, for example, occur at temperatures that may be well above ordinary environmental temperatures, e.g., greater than 50 degrees Centigrade (50° C.), and may be (for example) less than 300° C. or 400° C. These are merely some examples, and a number of different temperatures may be used for phase change.

The heat capacity material 512 may, for example, be provided on a surface of the tension bearing member 230, or may be provided within one or more fibers of the tension-bearing member. These are merely some examples.

FIG. 5B is a diagram illustrating a tension-bearing member according to another example embodiment. In this example, a capsule 514 may be provided with heat capacity material therein. For example, when the temperature a threshold temperature, the capsule 514 may melt or rupture, causing the heat capacity material to be released and applied to the tension-bearing member 230. The application of heat capacity material (for example, water or other material) may operate to cool the tension-bearing member 230 and/or increase the work capacity of the tension-bearing member 230.

A wide variety of materials may be used for a heat capacity material 512, or a phase change material. According to an example embodiment, heat capacity materials may, include one or more qualities, such as:

a. non-toxic (as people or objects may come into contact with the material);

b. non-corrosive to its storage environment (e.g., since the material may be in contact with the tension-bearing member or the actuatable cushioning element 210); for example, during storage, the material may be non-corrosive for long periods of time, and during operation or at higher temperatures the material may be non-corrosive for shorter periods of time.

c. a comparatively high heat of transformation (e.g., relatively high temperature for boiling or vaporization, fusion), e.g., so that relatively little material may be used to increase the work capacity of the tension bearing member d. can be readily brought into contact (either in advance or in response to an event, or based on a temperature change, etc.) with high-tensility material (tension-bearing member 230) being worked or deformed during a collision;

e. reasonable cost, e.g., sufficient quantities of the heat capacity material would not necessarily dominate the cost of the cushioning element or tension bearing member.

An example of a heat capacity material may be water, although many other materials may be used. The tension-bearing member (e.g., polyaramid fibers) may be soaked in water (or other material), which may increase the amount of work that the tension bearing member may perform, for example. Or, the water, as it is heated and boils or vaporizes, increases the work that may be performed on or by the associated tension-bearing member. As noted, the heat capacity material may use phase change in an example embodiments. In other example embodiments, heat capacity materials may be used that may improve the work capacity of the tension bearing member without necessarily involving a phase change or phase change material.

FIG. 6 illustrates an operational flow 600 representing example operations related to actuatable energy dissipative cushioning elements. In FIG. 6 and in following figures that include various examples of operational flows, discussion and explanation may be provided with respect to the above-described examples of FIGS. 1-5, and/or with respect to other examples and contexts. However, it should be understood that the operational flows may be executed in a number of other environments and contexts, and/or in modified versions of FIGS. 1-5. Also, although the various operational flows are presented in the sequence(s) illustrated, it should be understood that the various operations may be performed in other orders than those which are illustrated, or may be performed concurrently.

After a start operation, the operational flow 600 moves to a determining operation 610 where an event is determined. For example, an event detector 158 or 218 may detect or determine an event (or condition), or a series of events, such as a velocity that exceeds a threshold, an acceleration that exceeds a threshold, a change in acceleration or change in location or velocity, a relative location, velocity or acceleration of an object with respect to another object that is within a range or exceeds a threshold, etc. These are merely a few examples of events that may be detected, and many other events are possible.

Event detector 158 or 218 may include any type of detector or sensor. Event detector 158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold, for example. In another example embodiment, event detector 158 may include a Micro Electro Mechanical System (MEMS) accelerometer.

Event detector 158 and/or 218 may also, for example, include a speedometer, an accelerometer, Radar, a camera, a Gyro, or any other sensor, instrument or device that may allow the detection or determination of one or more of a variety of conditions or events, such as determining, for example: a relative location of a first object with respect to a second object; a relative velocity of a first object with respect to a second object; a relative acceleration of a first object with respect to a second object; a relative orientation of a first object with respect to a second object; a relative angular velocity of a first object with respect to a second object; or a relative angular acceleration of a first object with respect to a second object. These are merely some additional example events, and many other types of events may be detected or determined. The first and second objects in this example may be any type of objects.

Then, in an actuating operation 620, a cushioning element is actuated in response to the determining the event, the cushioning element including one or more tension-bearing members. For example, as shown in FIG. 2, element controller 214 may actuate actuatable cushioning element 210 in response to event detector 218 determining the event. This actuating may include element controller 214 or central controller 154 deploying or placing the actuatable cushioning element 210 in an initial or pre-collision state, for example. Actuatable cushioning element 210 (FIG. 2) may include one or more tension-bearing members 230 (e.g., 230A, 230B, 230C, 230D, 230E, . . . ).

Then, in a dissipating operation 630, at least some of an energy associated with a collision is dissipated based on deforming at least one of the tension-bearing members during the collision, the deforming including substantially inelastically stretching the at least one of the tension-bearing members. For example, at least some of the energy associated with a collision between two objects (e.g., between vehicles 410 and 420, FIG. 4) may be dissipated by a tension-bearing member 230 deforming and/or stretching during the collision. The deforming or stretching may include the tension-bearing member 230 stretching beyond an elastic limit for the tension-bearing member 230.

Figure 7:
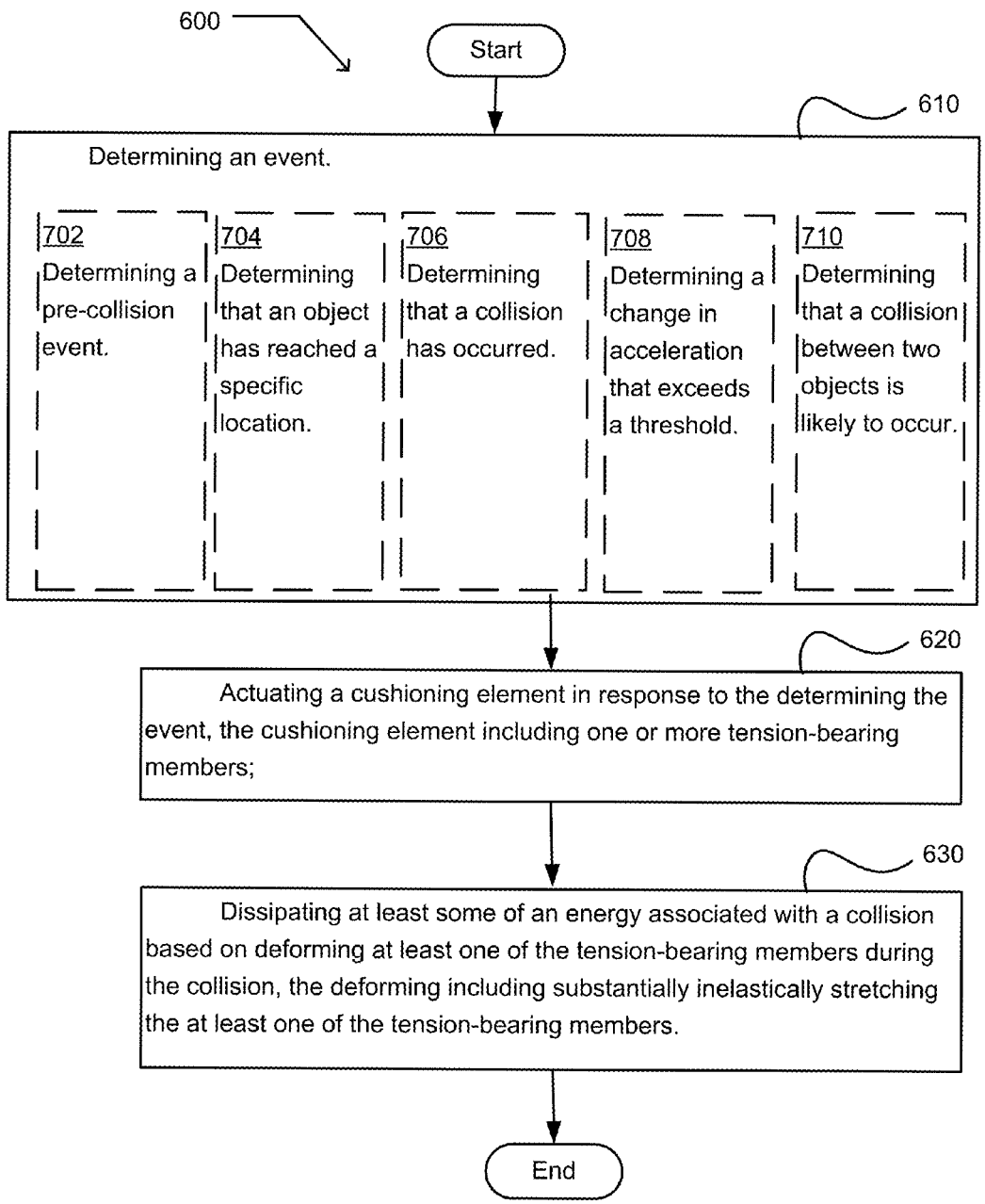
FIG. 7 illustrates an alternative embodiment of the example operational flow of FIG. 6.

FIG. 7 illustrates alternative embodiments of the example operational flow 600 of FIG. 6. FIG. 7 illustrates example embodiments where the determining operation 610 may include at least one additional operation. Additional operations may include operations 702, 704, 706, 708 and/or 710

At the operation 702, a pre-collision event is determined. For example, event detector 158 or 218 may determine or detect an event that occurs prior to a collision between two objects. For example, event detector 158 or 218 may detect that acceleration or velocity for a vehicle has exceeded a specific threshold, or that based on a vehicle's relative location and/or relative velocity with respect to another object (e.g., with respect to a rail, a wall, or another vehicle), a collision is likely to occur between a vehicle and another object.

At the operation 704, it is determined that an object has reached a specific location. For example, event detector 158 or 218 (e.g., as a GPS receiver or other location device) may determine that an automobile or vehicle is within 2 feet of a wall or other object, or has crossed over a median of a highway.

At the operation 706, it is determined that a collision has occurred. Event detector 158 or 218 may have detected a collision or impact based on other sensors on a vehicle 410, for example.

At the operation 708, a change in acceleration that exceeds a threshold is determined. For example, event detector 158 or 218 (e.g., as an accelerometer) may determine that an acceleration for vehicle 410 has exceeded a threshold (e.g., 0.2G).

At operation 710, it is determined that a collision between two objects is likely to occur. For example, event detector 158 or 218 (e.g., as GPS receiver or other sensor or instrument) and with controller 154 or 214, may determine, e.g., based on a location and/or velocity of a vehicle 410 with respect to another object (either fixed or moving) that a collision is likely to occur.

Figure 8:
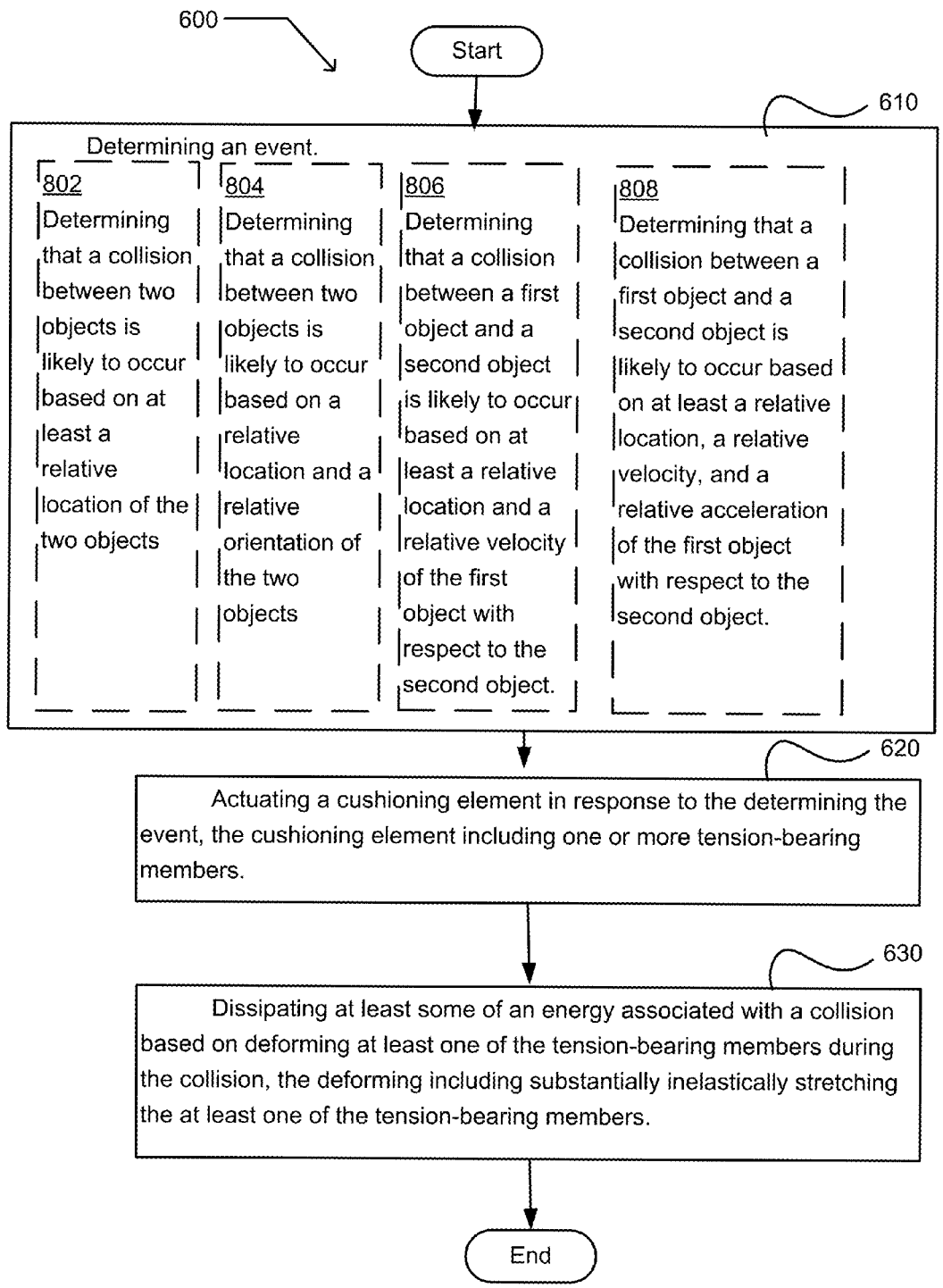
FIG. 8 illustrates an alternative embodiment of the example operational flow of FIG. 6.

FIG. 8 illustrates alternative embodiments of the example operational flow 600 of FIG. 6. FIG. 8 illustrates example embodiments where the determining operation 610 may include at least one additional operation. Additional operations may include operations 802, 804, 806, and/or 808.

At the operation 802, it is determined that a collision between two objects is likely to occur based on at least a relative location of the two objects. For example, event detector 158 or 218, and operating with controller 154 or 214, within vehicle 410 may determine that a collision with vehicle 510 is likely to occur based on the relative location of vehicle 410 to vehicle 420 (e.g., based on the distance between the two vehicles).

At the operation 804, it is determined that a collision between two objects is likely to occur based on a relative location and a relative orientation of the two objects. For example, controller 154 or 214 and event detector 158 or 218 may determine that vehicles 410 and 420 are within 5 feet of each other and are facing each other, and thus, a collision may be likely to occur.

At the operation 806, it is determined that a collision between a first object and a second object is likely to occur based on at least a relative location and a relative velocity of the first object with respect to the second object. For example, controller 154 or 214 and event detector 158 or 218 may determine that vehicle 410 is 10 feet away from vehicle 420, and the two vehicles are heading directly toward each other at a total speed (sum of speeds of both vehicles) of 87 MPH (miles per hour), which may indicate that a collision is likely to occur.

At the operation 808, it is determined that a collision between a first object and a second object is likely to occur based on at least a relative location, a relative velocity, and a relative acceleration of the first object with respect to the second object. For example, controller 154 or 214 and event detector 158 or 218 within a vehicle 410 (FIG. 4) may determine that a collision between a vehicle 410 and vehicle 420 is likely to occur based on at least a relative location, a relative velocity, and a relative acceleration of vehicle 410 with respect to vehicle 420.

Figure 9:
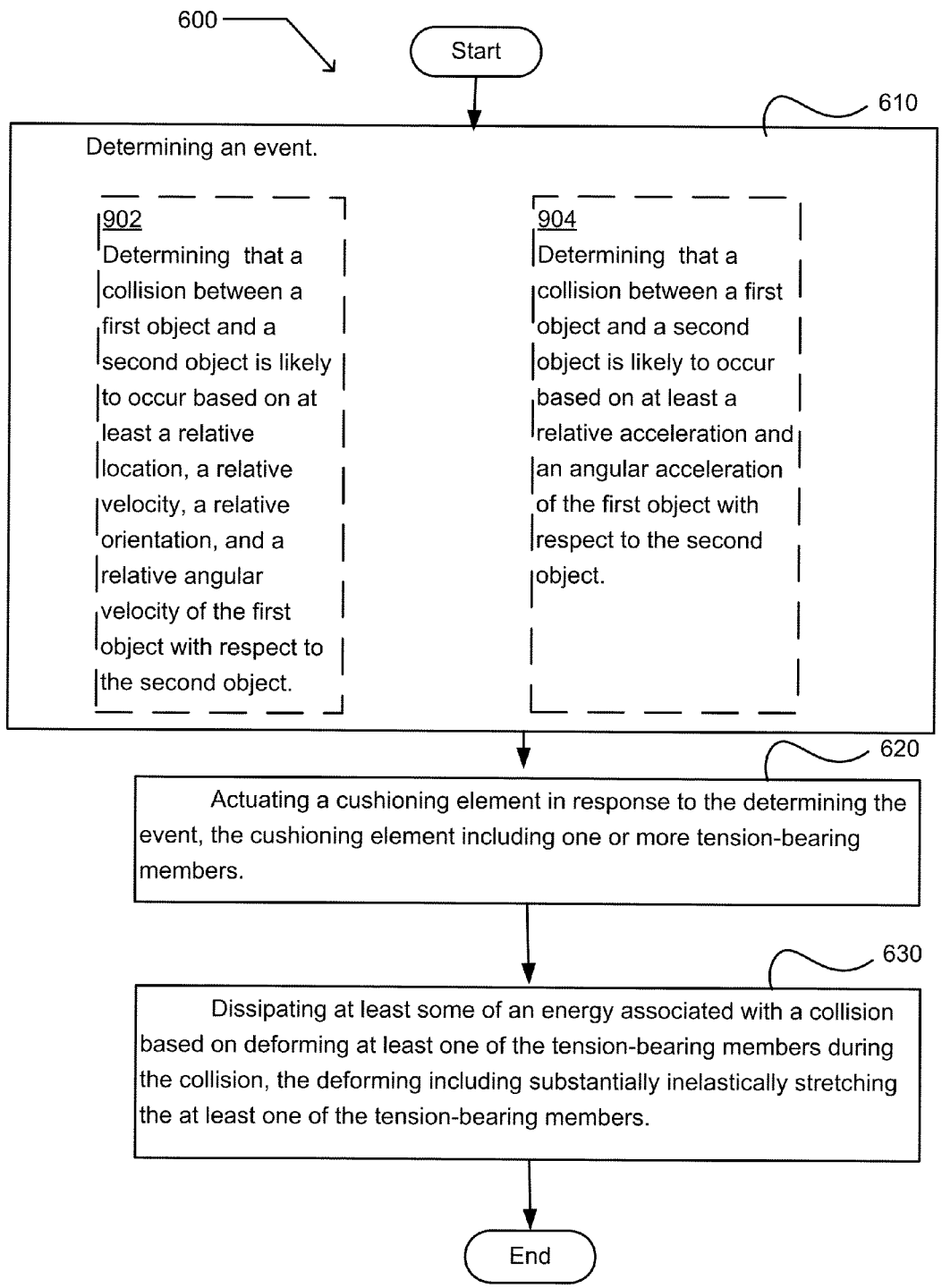
FIG. 9 illustrates an alternative embodiment of the example operational flow of FIG. 6.

FIG. 9 illustrates alternative embodiments of the example operational flow 600 of FIG. 6. FIG. 9 illustrates example embodiments where the determining operation 610 may include at least one additional operation. Additional operations may include operations 902 and/or 904.

At the operation 902, it is determined that a collision between a first object and a second object is likely to occur based on at least a relative location, a relative velocity, a relative orientation, and a relative angular velocity of the first object with respect to the second object. For example, controller 154 or 214 and event detector 158 or 218 within a vehicle 410 (FIG. 4) may determine that a collision between a vehicle 410 and vehicle 420 is likely to occur based on at least a relative location, a relative velocity, a relative orientation, and a relative angular velocity of vehicle 410 with respect to vehicle 420 (FIG. 4).

At the operation 904, it is determined that a collision between a first object and a second object is likely to occur based on at least a relative acceleration and an angular acceleration of the first object with respect to the second object. For example, controller 154 or 214 and event detector 158 or 218 within a vehicle 410 (FIG. 4) may determine that a collision between a vehicle 410 and vehicle 420 is likely to occur based on at least a relative acceleration and an angular acceleration of vehicle 410 with respect to vehicle 420 (FIG. 4).

Figure 10:
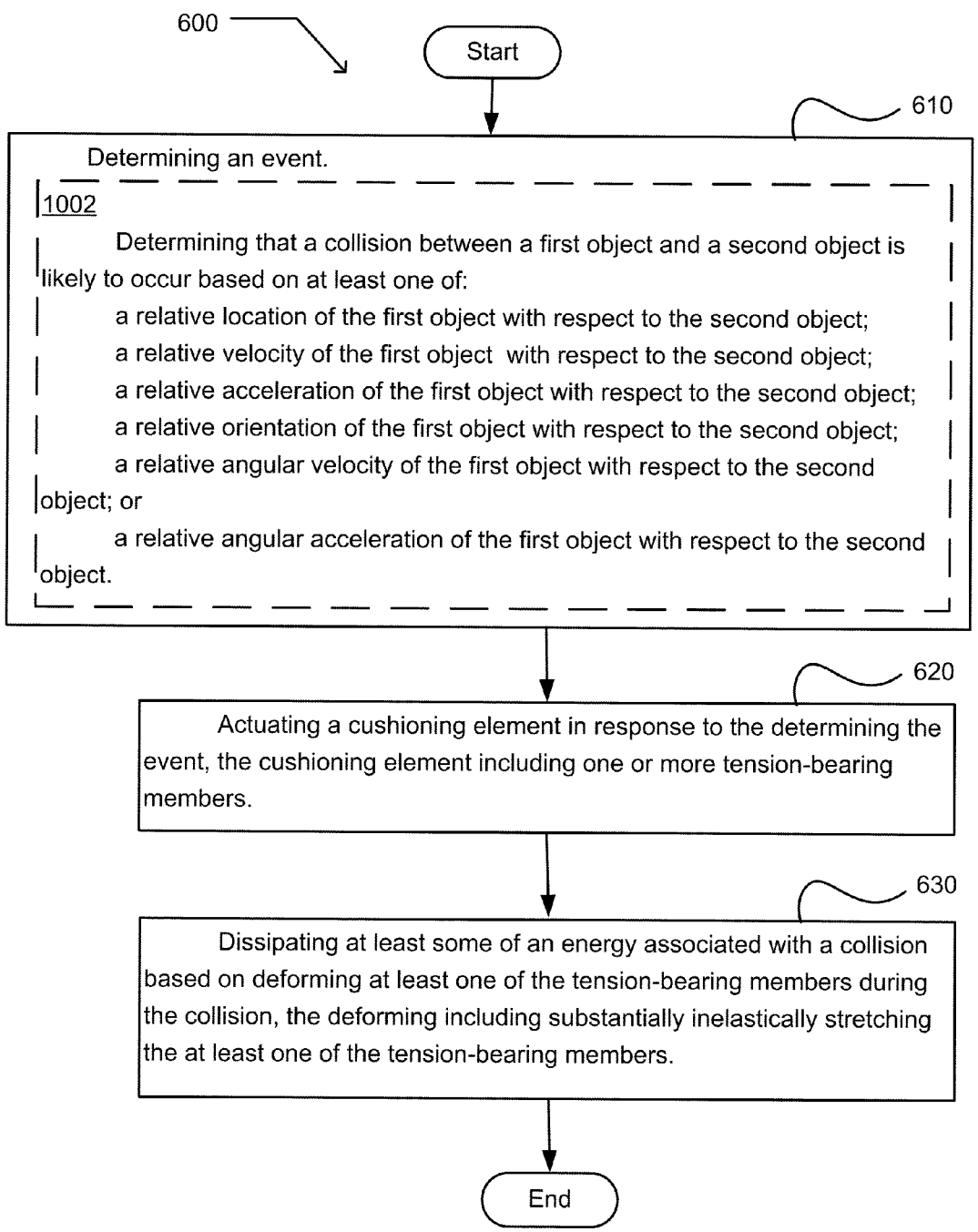
FIG. 10 illustrates an alternative embodiment of the example operational flow of FIG. 6.

FIG. 10 illustrates alternative embodiments of the example operational flow 600 of FIG. 6. FIG. 10 illustrates example embodiments where the determining operation 610 may include at least one additional operation. Additional operations may include operation 1002.

At the operation 1002, it is determined that a collision between a first object and a second object is likely to occur based on at least one of a relative location of the first object with respect to the second object, a relative velocity of the first object with respect to the second object, a relative acceleration of the first object with respect to the second object, a relative orientation of the first object with respect to the second object, a relative angular velocity of the first object with respect to the second object, or a relative angular acceleration of the first object with respect to the second object. For example, controller 154 or 214 and event detector 158 or 218 within a vehicle 410 (FIG. 4) may determine that a collision between a vehicle 410 and vehicle 420 is likely to occur based on at least one of a relative location, relative velocity, relative acceleration, a relative orientation, a relative angular velocity, or a relative angular acceleration of vehicle 410 with respect to vehicle 420 (FIG. 4).

Figure 11:
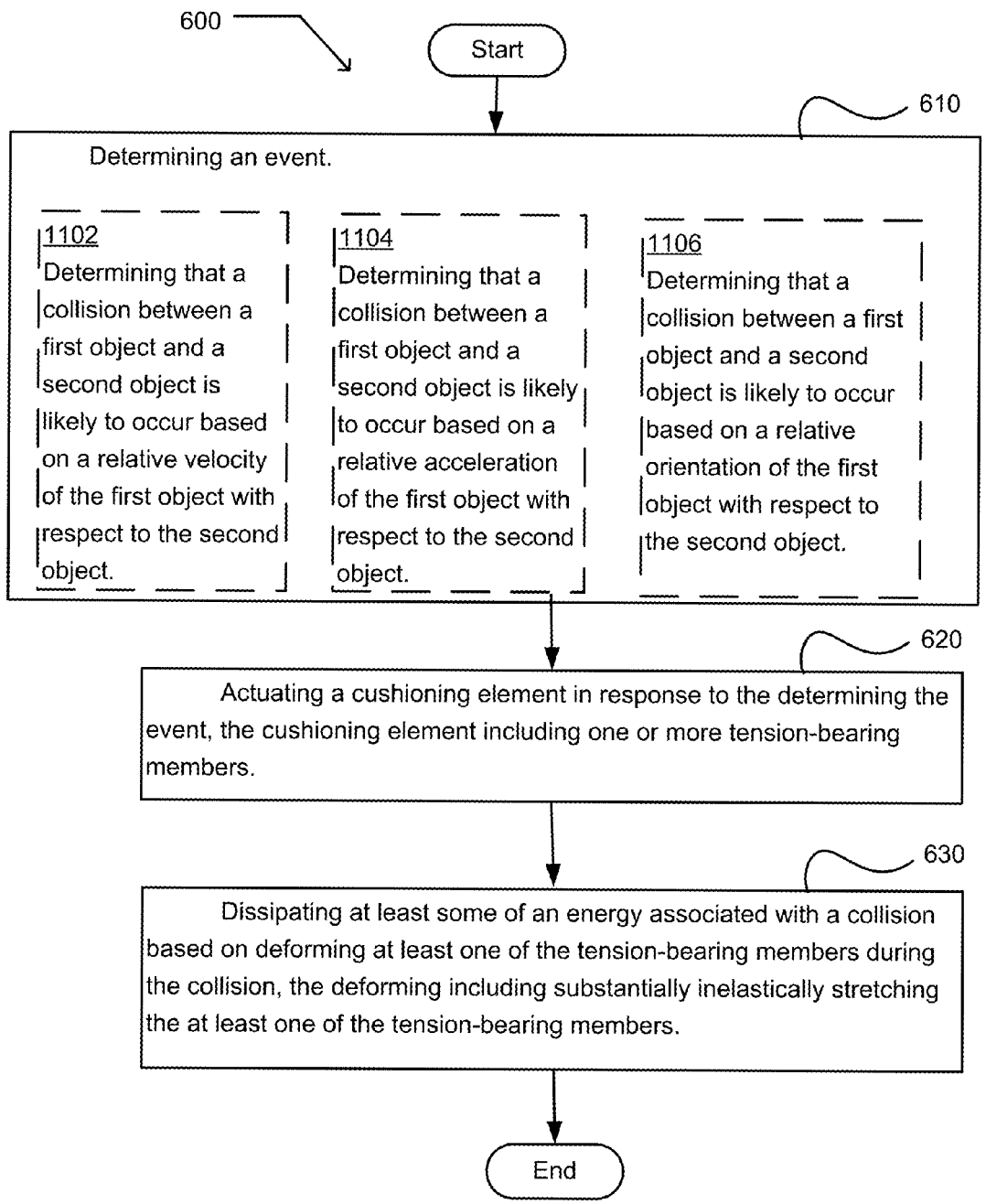
FIG. 11 illustrates an alternative embodiment of the example operational flow of FIG. 6.

FIG. 11 illustrates alternative embodiments of the example operational flow 600 of FIG. 6. FIG. 11 illustrates example embodiments where the determining operation 610 may include at least one additional operation. Additional operations may include operations 1102, 1104 and/or 1106.

At the operation 1102, it is determined that a collision between a first object and a second object is likely to occur based on a relative velocity of the first object with respect to the second object. For example, controller 154 or 214 and event detector 158 or 218 within a vehicle 410 (FIG. 4) may determine that a collision between a vehicle 410 and vehicle 420 is likely to occur based on a relative velocity of vehicle 410 with respect to the velocity of vehicle 420.

At the operation 1104, it is determined that a collision between a first object and a second object is likely to occur based on a relative acceleration of the first object with respect to the second object. For example, controller 154 or 214 and event detector 158 or 218 within a vehicle 410 (FIG. 4) may determine that a collision between a vehicle 410 and vehicle 420 is likely to occur based on a relative acceleration of vehicle 410 with respect to the acceleration of vehicle 420.

At the operation 1106, it is determined that a collision between a first object and a second object is likely to occur based on a relative orientation of the first object with respect to the second object. For example, controller 154 or 214 and event detector 158 or 218 within a vehicle 410 (FIG. 4) may determine that a collision between a vehicle 410 and vehicle 510 is likely to occur based on a relative orientation of vehicle 410 with respect to the acceleration and/or orientation of vehicle 420.

Figure 12:
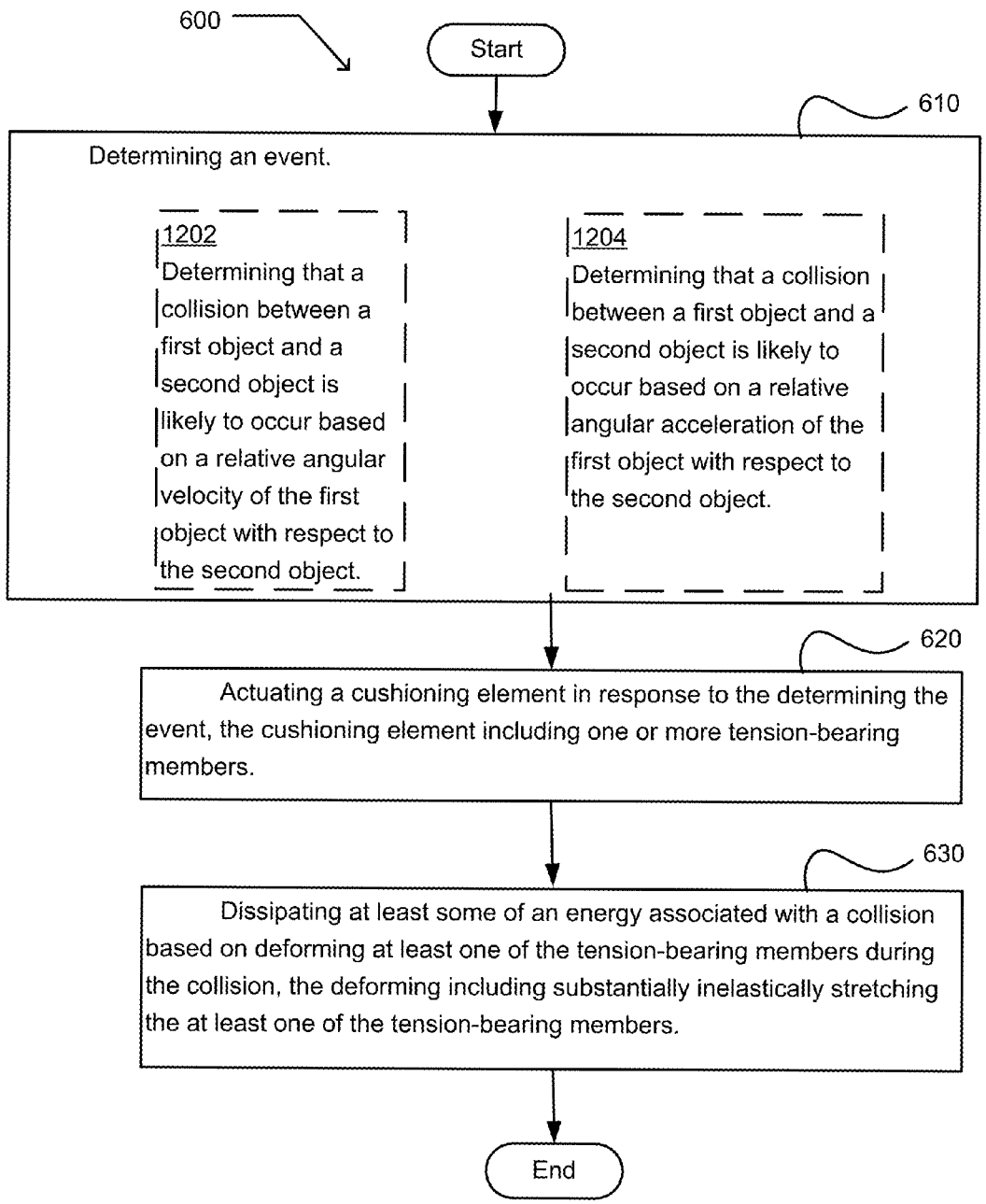
FIG. 12 illustrates an alternative embodiment of the example operational flow of FIG. 6.

FIG. 12 illustrates alternative embodiments of the example operational flow 600 of FIG. 6. FIG. 12 illustrates example embodiments where the determining operation 610 may include at least one additional operation. Additional operations may include operations 1202 and/or 1204.

At the operation 1202, it is determined that a collision between a first object and a second object is likely to occur based on a relative angular velocity of the first object with respect to the second object. For example, controller 154 or 214 and event detector 158 or 218 within a vehicle 410 (FIG. 4) may determine that a collision between a vehicle 410 and vehicle 420 is likely to occur based on a relative angular velocity of vehicle 410 with respect to the angular velocity of vehicle 420.

At the operation 1204, it is determined that a collision between a first object and a second object is likely to occur based on a relative angular acceleration of the first object with respect to the second object. For example, controller 154 or 214 and event detector 158 or 218 within a vehicle 410 (FIG. 4) may determine that a collision between a vehicle 410 and vehicle 420 is likely to occur based on a relative angular acceleration of vehicle 410 with respect to the acceleration of vehicle 420.

Figure 13:
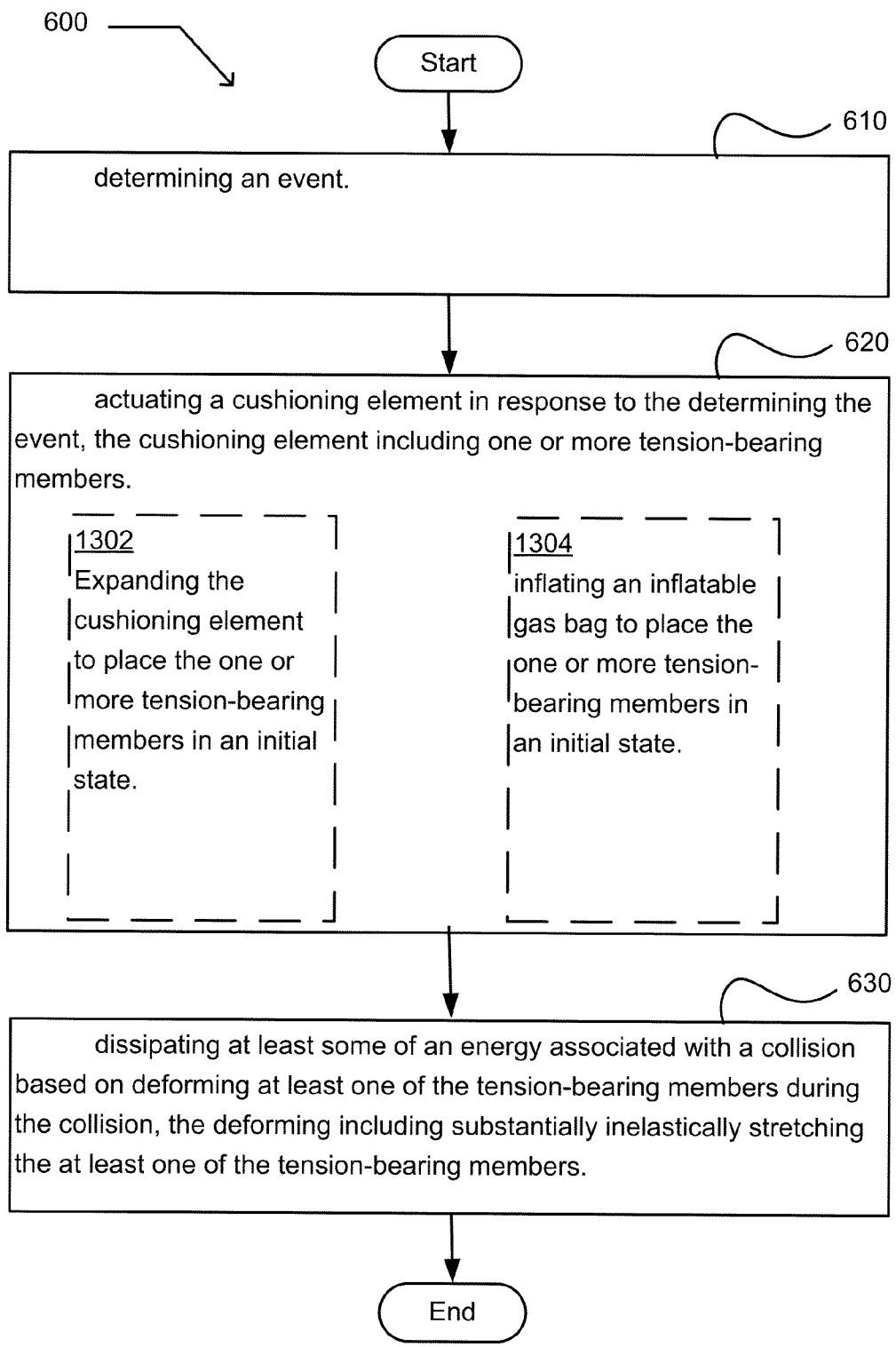
FIG. 13 illustrates an alternative embodiment of the example operational flow of FIG. 6.

FIG. 13 illustrates alternative embodiments of the example operational flow 600 of FIG. 6. FIG. 13 illustrates example embodiments where the actuating operation 620 may include at least one additional operation. Additional operations may include operations 1302 and/or 1304.

At the operation 1302, the cushioning element is expanded to place the one or more tension-bearing members in an initial state. For example, under operation of element controller 214, stored energy reservoir 220 (FIG. 2) may expand actuatable cushioning element 210 to place one or more tension bearing members 230 in an initial (e.g., pre-collision) state. An initial state may, for example, place the tension-bearing members in a position or state where they may be prepared to dissipate energy or perform work during a collision, e.g., by deforming or stretching. This is merely an example initial state, and other initial states may be used.

At the operation 1304, an inflatable gas bag is inflated to place the one or more tension-bearing members in an initial state. For example, under operation of element controller 214, stored energy reservoir 220 (FIG. 2) may pump gas to inflate actuatable cushioning element 210 or a gas bag to place one or more tension bearing members 230 in an initial state.

Figure 14:
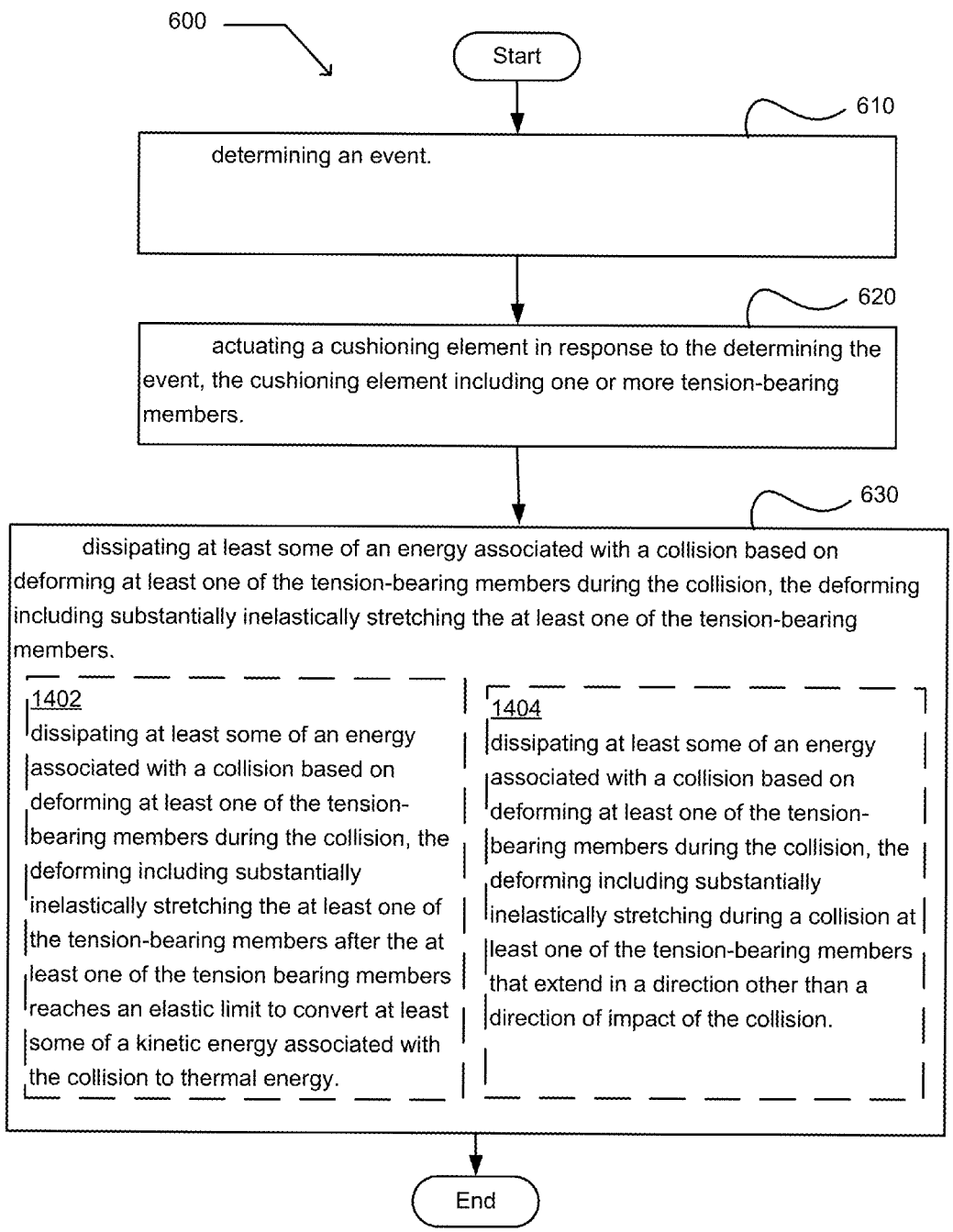
FIG. 14 illustrates an alternative embodiment of the example operational flow of FIG. 6.

FIG. 14 illustrates alternative embodiments of the example operational flow 600 of FIG. 6. FIG. 14 illustrates example embodiments where the dissipating operation 630 may include at least one additional operation. Additional operations may include operations 1402 and/or 1404.

At the operation 1402, at least some of an energy associated with a collision is dissipated based on deforming at least one of the tension-bearing members during the collision, the deforming including substantially inelastically stretching the at least one of the tension-bearing members after the at least one of the tension bearing members reaches an elastic limit to convert at least some of a kinetic energy associated with the collision to thermal energy. For example, at least some of the energy associated with a collision between vehicles 410 and 420 may be dissipated based on deforming tension-bearing members 230C, 230D and 230E (FIG. 3B) during the collision. This deforming may include inelastically stretching tension-bearing members 230C, 230D and/or 230E beyond an elastic limit to convert at least some of a kinetic energy associated with the collision to thermal energy.

At the operation 1404, at least some of an energy associated with a collision is dissipated based on deforming at least one of the tension-bearing members during the collision, the deforming including substantially inelastically stretching during a collision at least one of the tension-bearing members that extend in a direction other than a direction of impact of the collision. For example, at least some of the energy associated with a collision between vehicles 410 and 420 may be dissipated based on deforming and inelastically stretching during the collision one or more of tension-bearing members 230C, 230D and 230E, which may extend in a direction other than a direction of impact of the collision 239 (FIG. 3B).

For example, a portion of the actuatable cushioning element 210 receiving the impact (e.g., along a direction of impact of collision) may become shorter or smaller, which may cause the corresponding tension bearing members 230A and 230B that extend along the direction of impact to go loose or slack during the collision (e.g., not perform substantial work). While portions of the cushioning element 210 that extend or provided in other directions (directions other than the direction of impact 239 such as a direction that is substantially perpendicular to the direction of impact) may at least in some cases lengthen (or attempt to lengthen) during the collision, causing the corresponding tension-bearing members 230C, 230D and 230E to stretch or perform work and dissipate some of the kinetic energy associated with the collision. This is merely an example embodiment. In another example embodiment, the actuatable cushioning element may be provided as a web or mesh of tension-bearing members, without a bag to support the tension-bearing members.

Figure 15:
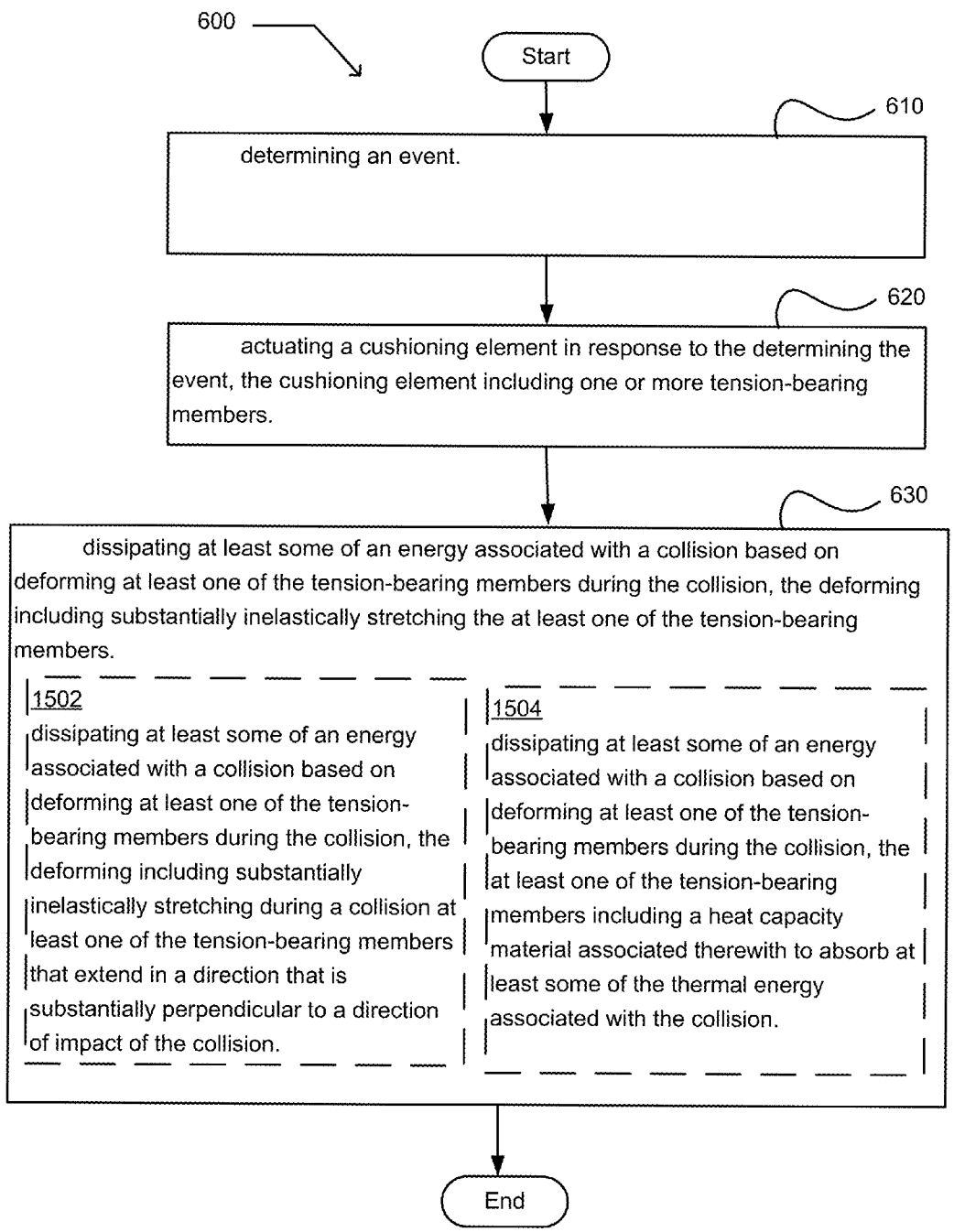
FIG. 15 illustrates an alternative embodiment of the example operational flow of FIG. 6.

FIG. 15 illustrates alternative embodiments of the example operational flow 600 of FIG. 6. FIG. 15 illustrates example embodiments where the dissipating operation 630 may include at least one additional operation. Additional operations may include operations 1502 and/or 1504.

At the operation 1502, at least some of an energy associated with a collision is dissipated based on deforming at least one of the tension-bearing members during the collision, the deforming including substantially inelastically stretching during a collision at least one of the tension-bearing members that extend in a direction that is substantially perpendicular to a direction of impact of the collision. For example, tension-bearing member 230C, which may extend in a direction (FIG. 3B) that is substantially perpendicular to direction of impact of the collision 239, may stretch during a collision to dissipate at least some of the energy associated with the collision.

At the operation 1504, at least some of an energy associated with a collision is dissipated based on deforming at least one of the tension-bearing members during the collision, the at least one of the tension-bearing members including a heat capacity material associated therewith to absorb at least some of the thermal energy associated with the collision. For example, tension-bearing member 230 may include a heat capacity material 512 (e.g., FIG. 5A) applied thereto to absorb at least some of the thermal energy that may be generated by the work performed by the tension-bearing member 230. Thus, the heat capacity material 512 may, at least in some cases, increase the work capacity of the tension-bearing member 230.

Figure 16:
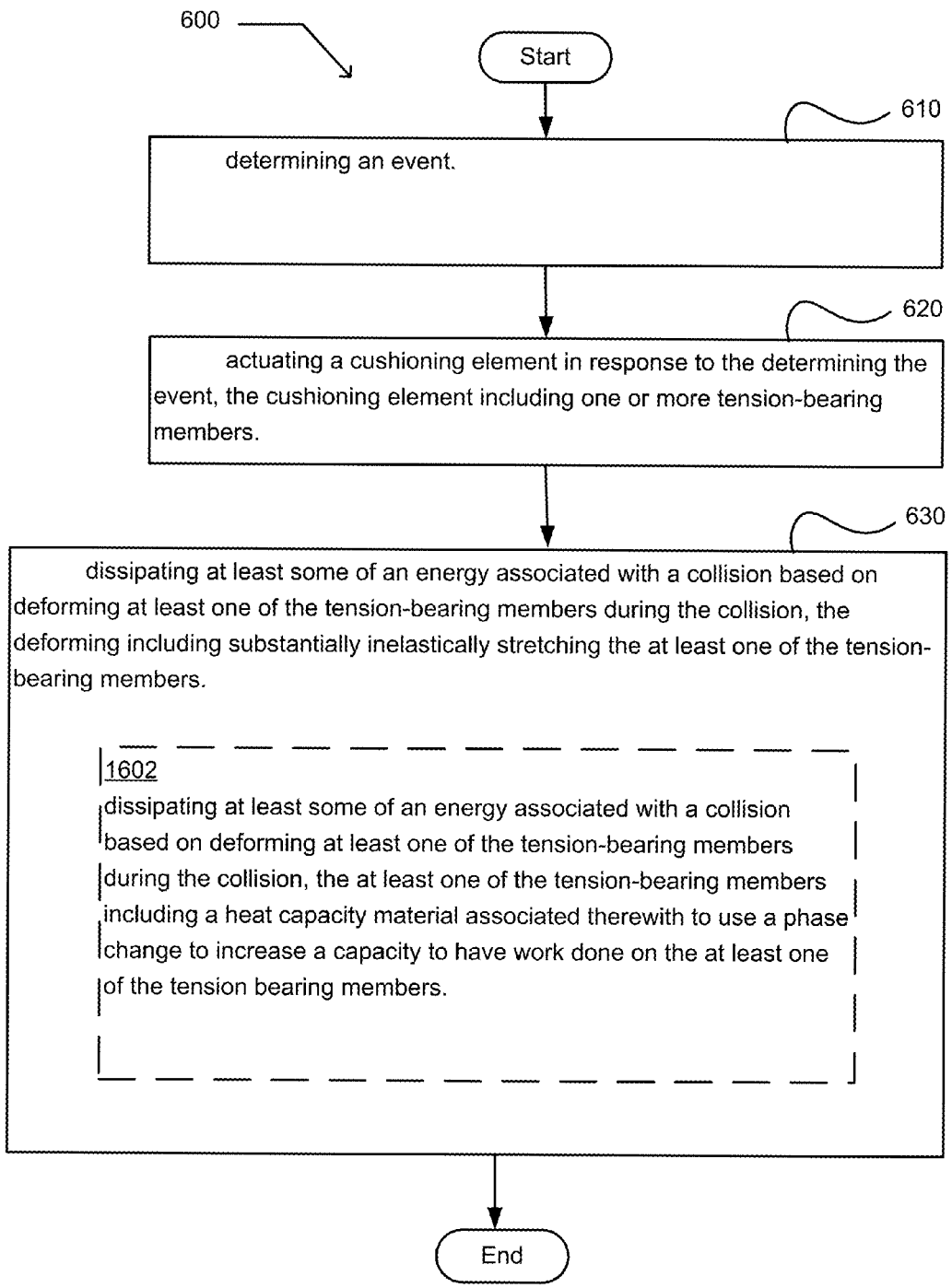
FIG. 16 illustrates an alternative embodiment of the example operational flow of FIG. 6.

FIG. 16 illustrates alternative embodiments of the example operational flow 600 of FIG. 6. FIG. 16 illustrates example embodiments where the dissipating operation 630 may include at least one additional operation. Additional operations may include operation 1602.

At the operation 1602, at least some of an energy associated with a collision is dissipated based on deforming at least one of the tension-bearing members during the collision, the at least one of the tension-bearing members including a heat capacity material associated therewith to use a phase change to increase a capacity to have work done on the at least one of the tension bearing members. For example, tension-bearing member 230 may include a heat capacity material 512 (FIG. 5B), such as water, associated with the tension-bearing member 230. For example, the tension-bearing member 230 may be soaked in water, or the water may otherwise be applied to a surface of the tension-bearing member 230. In an example embodiment, the heat capacity material 512, after being applied to the tension-bearing member 230, may undergo a phase change, e.g., from water to gas (or other phase change)

during the collision, which may increase a capacity to have work done on (or by) the at least one of the tension-bearing members 230.

Figure 17:
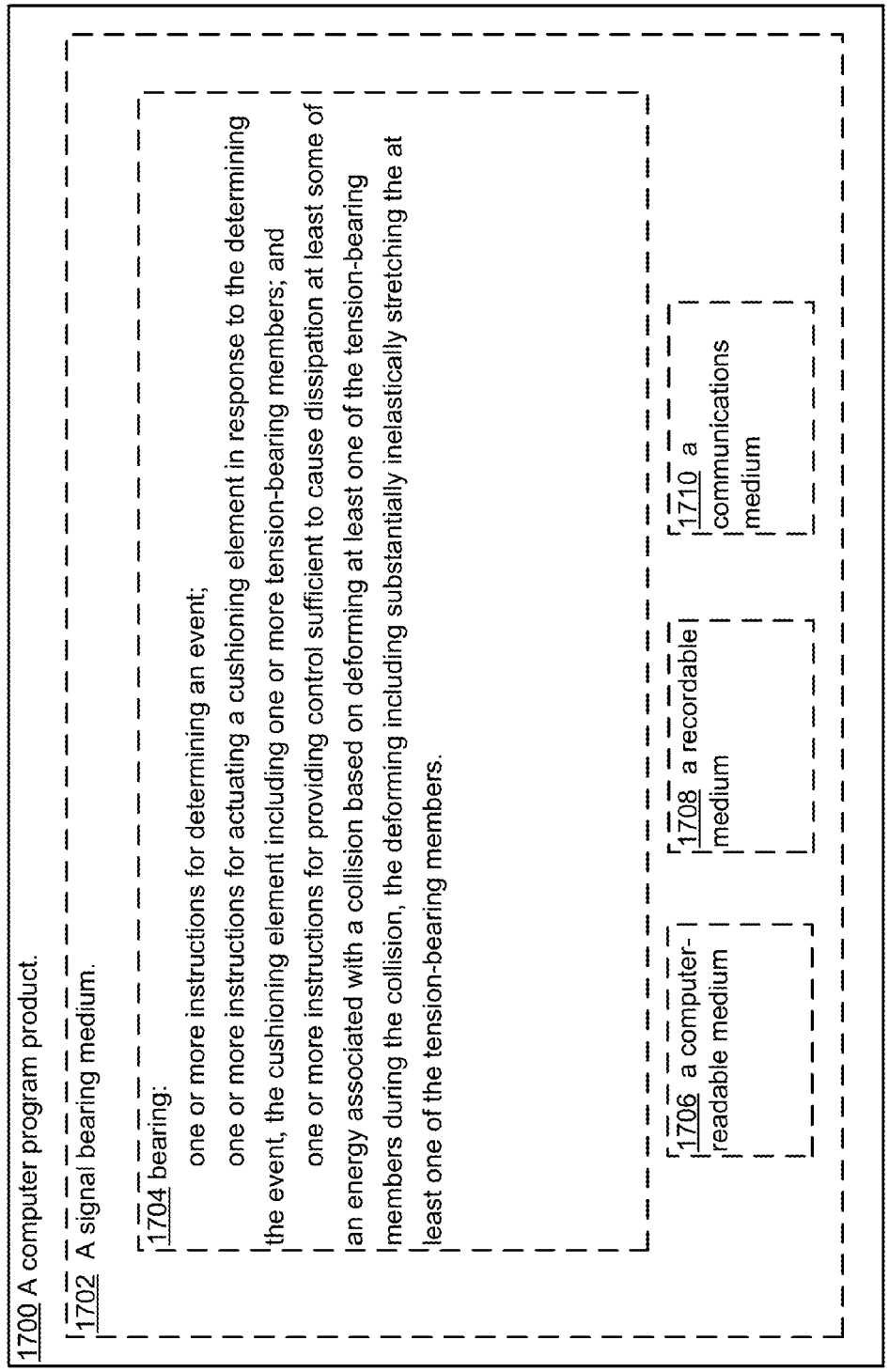
FIG. 17 illustrates a partial view of an example computer program product 1700.

FIG. 17 illustrates a partial view of an example computer program product 1700 that includes a computer program 1704 for executing a computer process on a computing device. An embodiment of the example computer program product 1700 is provided using a signal bearing medium 1702, and may include one or more instructions for one or more instructions for determining an event, the signal bearing medium also bearing one or more instructions for actuating a cushioning element in response to the determining the event, the cushioning element including one or more tension-bearing members, and the signal bearing medium also bearing one or more instructions for providing control sufficient to cause dissipation at least some of an energy associated with a collision based on deforming at least one of the tension-bearing members during the collision, the deforming including substantially inelastically stretching the at least one of the tension-bearing members. The one or more instructions may be, for example, computer executable and/or logic-implemented instructions. In one implementation, the signal-bearing medium 1702 may include a computer-readable medium 1706. In one implementation, the signal bearing medium 1702 may include a recordable medium 1708. In one implementation, the signal bearing medium 1702 may include a communications medium 1710.

FIG. 18 illustrates an example system 1800. The system 1800 may include a computing device 1810. The system 1800 may also include one or more instructions that when executed on the computing device cause the computing device to: (a) determine an event; (b) actuate a cushioning element in response to the determining the event, the cushioning element including one or more tension-bearing members; and (c) provide control sufficient to dissipate at least some of an energy associated with a collision based on deforming at least one of the tension-bearing members during the collision, the deforming including substantially inelastically stretching the at least one of the tension-bearing members 1820. In some implementations, the computing device 1800 may be a computational device embedded in a vehicle, or may be a functionally-dedicated computational device. In some implementations, the computing device 1800 may be include a distributed computational device including one or more devices on a vehicle configured to communicate with a remote control plant (e.g., such as communicating with a remote computer via a wireless network).

In an alternative embodiment, the computing device 1810 may include one or more of a personal digital assistant (PDA), a laptop computer, a tablet personal computer, a networked computer, a computing system comprised of a cluster of processors, a workstation computer, and/or a desktop computer (1812).

FIG. 19 illustrates an example apparatus 1900 in which embodiments may be implemented. In implementation 1910, the apparatus 1900 may include a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation. For example, actuatable cushioning element 210 (FIG. 5A) may include one or more tension-bearing members 230A, 230B, 230C, . . . . The tension-bearing members 230 may deform in response to a collision or impact. At least one of the tension-bearing members 230 (e.g., 230C) may substantially inelastically deform after reaching an elastic limit.

FIG. 19 also illustrates alternative embodiments of the example apparatus 1900. FIG. 19 illustrates example embodiments that may include at least one additional implementation. Additional implementations may include implementations 1912, 1922, 1924, 1930 and/or 1940.

In implementation 1912, the implementation 1910 may include a cushioning element, the cushioning element including one or more tension-bearing members, at least one of the one or more tension-bearing members configured to deform in response to a collision or impact, including the at least one of the one or more tension-bearing members being configured to substantially inelastically stretch after reaching an elastic limit. For example, tension-bearing member 230C may inelastically stretch during a collision after reaching an elastic limit.

In implementation 1922, the apparatus 1900 may further include a heat capacity material associated with at least one of the tension-bearing members. For example, a heat capacity material 512 (FIG. 5A) associated with tension-bearing member 230.

In implementation 1924, the apparatus 1900 may further include a heat capacity material in contact with at least one of the one or more tension-bearing members to increase a work capacity of the at least one of the one or more tension-bearing members. For example, a heat capacity material 512 (FIG. 5A) may be in contact with the tension-bearing member 230 to increase a work capacity of the tension-bearing member 230.

In implementation 1930, the apparatus 1900 may further include an element controller configured to control the cushioning element. For example, an element controller 214 (FIG. 2) or other controller may control the actuatable cushioning element 210, such as providing overall control or controlling the actuation of the actuatable cushioning element 210 including, in some cases, providing control over operation of tension-bearing members 230.

In implementation 1940, the apparatus 1900 may further include an event detector coupled to the element controller configured to detect an event. For example, an event detector 218 (FIG. 2) may be coupled to an element controller 214 to detect an event.

FIG. 20 also illustrates alternative embodiments of the example apparatus 1900. FIG. 20 illustrates example embodiments that may include at least one additional implementation. Additional implementations may include implementations 2002, 2004, 2006, 2008, 2010 and/or 2012.

In implementation 2002, at least one of the one or more tension-bearing members comprises one or more polyaramid fibers. For example, a tension-bearing member 230C may comprise one or more polyaramid fibers.

In implementation 2004, one or more of the tension-bearing members (e.g., tension-bearing member 230C) comprises at least one of a graphitic fiber, a carbon fiber, and/or a natural fiber.

In implementation 2006, one or more of the tension-bearing members (e.g., tension-bearing member 230C) comprises at least one of a poly-benzobisoxazole fiber, and/or a synthetic fiber.

In implementation 2008, at least one of the one or more tension-bearing members (e.g., 230C) lies on a surface of the cushioning element (e.g., cushioning element 210, FIGS. 3A and 3B).

In implementation 2010, at least one of the one or more tension-bearing members (e.g., 230C) lies within an interior portion of the cushioning element (e.g., 210, FIGS. 3A and 3B).

In implementation 2012, at least some of the tension-bearing members have different tension properties than other tension-bearing members. For example, tension-bearing member 230C may have a tensile strength, a thickness or size, may be made from a material, or other tension property that may be different from one or more such tension properties of tension bearing members 230D and 230E (FIG. 2), for example.

Figure 21:
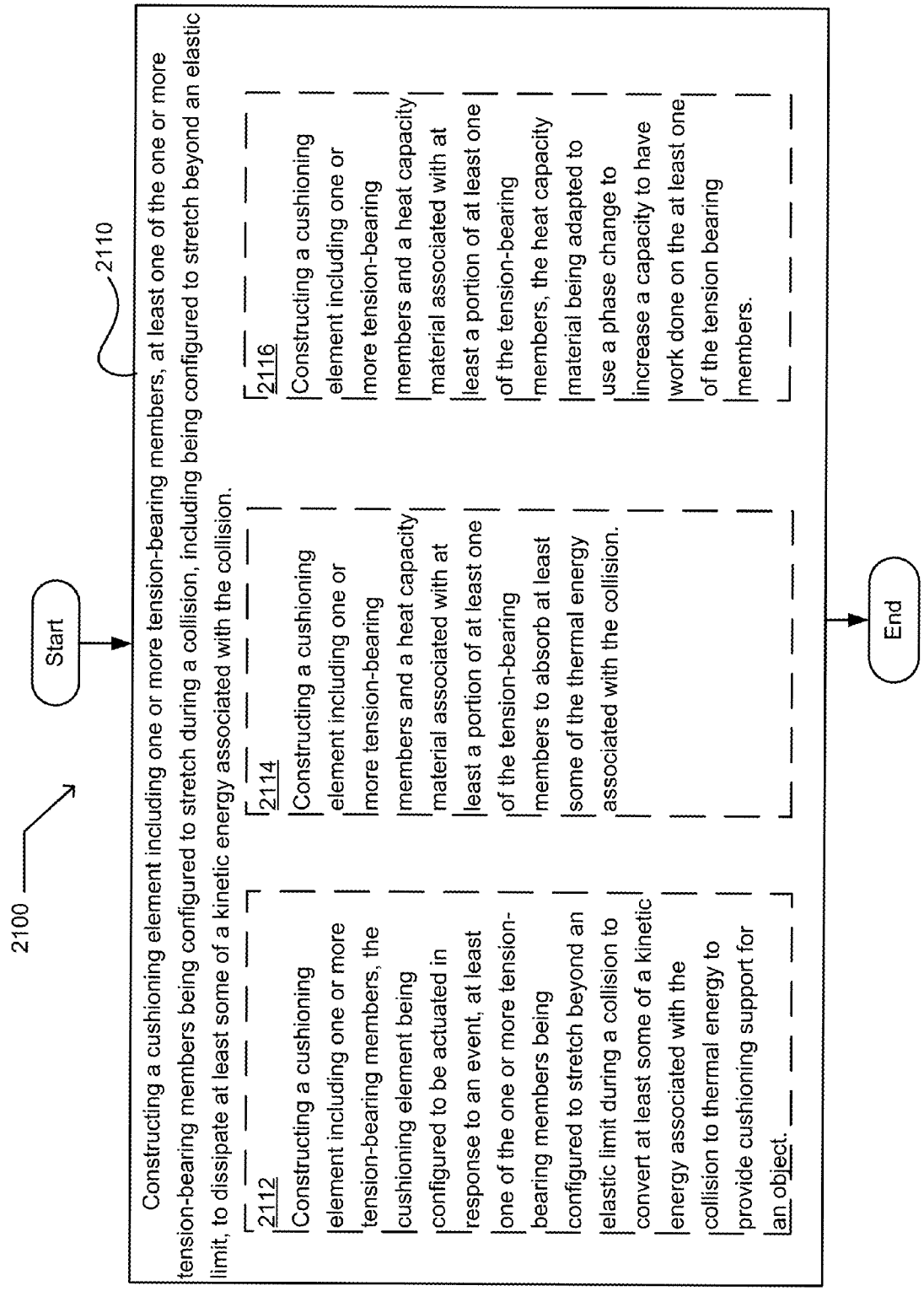
FIG. 21 illustrates an operational flow 2100 representing example operations related to cushioning elements.

FIG. 21 illustrates an operational flow 2100 representing example operations related to cushioning elements.

At operation 2110, a cushioning element is constructed including one or more tension-bearing members, at least one of the one or more tension-bearing members being configured to stretch during a collision, including being configured to stretch beyond an elastic limit, to dissipate at least some of a kinetic energy associated with the collision. For example, an actuatable cushioning element 210A, 210B (FIGS. 3A and 3B) may be constructed that includes one or more tension-bearing members 230A, 230B, 230C, 230D, and/or 230E, . . . . At least one of these tension bearing members (e.g., tension-bearing member 230D) may stretch during a collision, including stretching beyond an elastic limit to dissipate at least some of a kinetic energy associated with a collision, e.g., associated with a collision between vehicles 410 and 420 (or between two other objects).

FIG. 21 also illustrates alternative embodiments of the example operational flow 2100 of FIG. 21. FIG. 21 illustrates example embodiments where the determining operation 610 may include at least one additional operation. Additional operations may include operations 2112, 2114 and/or 2116.

At operation 2112, a cushioning element is constructed including one or more tension-bearing members, the cushioning element being configured to be actuated in response to an event, at least one of the one or more tension-bearing members being configured to stretch beyond an elastic limit during a collision to convert at least some of a kinetic energy associated with the collision to thermal energy to provide cushioning support for an object. For example, cushioning element 210A (FIG. 3A) may include one or more tension bearing members 230. The cushioning element 210A may be configured to be actuated in response to an event (e.g., an event detected by an event detector 158 or 218, FIGS. 1, 2). At least one of the tension bearing members, e.g., tension bearing member 230D, may be configured to stretch beyond an elastic limit during a collision (e.g., during a collision between vehicles 410 and 420) to convert at least some of a kinetic energy associated with the collision to thermal energy to provide cushioning support for an object, such as for vehicle 410 (FIG. 4) or passengers therein.

At operation 2114, a cushioning element is constructed including one or more tension-bearing members and a heat capacity material associated with at least a portion of at least one of the tension-bearing members to absorb at least some of the thermal energy associated with the collision. This thermal energy absorption may limit the temperature rise experienced by tension-bearing member(s) associated with the collision, and may thereby increase a capacity to have work done on the at least one of the tension-bearing members. For example, a cushioning element 210 may be constructed that includes one or more tension-bearing members 230. The tension-bearing member 230 may include a heat capacity material 512 (FIG. 5A), which may be water or other heat capacity material, to absorb at least some of the thermal energy associated with the collision.

At operation 2116, a cushioning element is constructed including one or more tension-bearing members and a heat capacity material associated with at least a portion of at least one of the tension-bearing members, the heat capacity material being adapted to use a phase change to increase a capacity to have work done on the at least one of the tension bearing members. For example, a cushioning element 210 (e.g., FIG. 3A) may be constructed to include one or more tension-bearing members 230 (FIG. 3A and FIG. 5A, 5B), and a heat capacity material 512 associated with at least a portion of one of the tension-bearing members (e.g., tension-bearing member 230D). Heat capacity material 512 may be water or other appropriate material. Heat capacity material may be adapted to undergo a phase change (e.g., water to gas, solid to liquid, solid to gas), such as during the collision, increase a capacity to have work done on the at least one of the tension-bearing members 230D. For example, water may be utilized to cool the tension-bearing member, and this water or heat capacity material 512 may boil off during a collision to increase the work capacity for the tension-bearing member 230D. In some instances, thermal energy absorption may limit the temperature rise experienced by the tension-bearing member(s) associated with a collision, and may thereby increase a capacity to have work done on the at least one of the tension-bearing members. This is merely an example, and the disclosure is not limited thereto.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. An apparatus comprising:
a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members.

2. The apparatus of claim 1 wherein the cushioning element includes the at least one of the one or more tension-bearing members configured to substantially inelastically stretch after reaching an elastic limit.

3. The apparatus of claim 1 wherein at least one of the one or more tension-bearing members comprises:
one or more polyaramid fibers.

4. The apparatus of claim 1 wherein one or more of the tension-bearing members comprises:
at least one of a graphitic fiber, a carbon fiber, and/or a natural fiber.

5. The apparatus of claim 1 wherein at least one of the one or more tension-bearing members comprises:
at least one of a poly-benzobisoxazole fiber, and/or a synthetic fiber.

6. The apparatus of claim 1 and further comprising a heat capacity material associated with at least one of the tension-bearing members.

7. The apparatus of claim 1 and further comprising a heat capacity material in contact with at least one of the one or more tension-bearing members to increase a work capacity of the at least one of the one or more tension-bearing members.

8. The apparatus of claim 1 wherein at least one of the one or more tension-bearing members lies within an interior portion of the cushioning element.

9. The apparatus of claim 1 wherein at least some of the tension-bearing members have different tension properties than other tension-bearing members.

10. The apparatus of claim 1 wherein the apparatus further comprises:
an element controller configured to control the cushioning element; and
an event detector coupled to the element controller configured to detect an event.

11. The apparatus of claim 1 wherein the a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:
one or more heat absorbing materials contained within the one or more capsules configured to change phase from solid to gas through heat absorption of heat generated from deformation of the one or more tension bearing members upon release from the one or more capsules.

12. The apparatus of claim 1 wherein the a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:
one or more heat absorbing materials contained within the one or more capsules configured to change phase from liquid to gas through heat absorption of heat generated from deformation of the one or more tension bearing members upon release from the one or more capsules.

13. The apparatus of claim 1 wherein the a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:

one or more heat absorbing materials contained within the one or more capsules configured to change phase through heat absorption of heat generated from elastic deformation of the one or more tension bearing members upon release from the one or more capsules.

14. The apparatus of claim 1 wherein the a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:

one or more heat absorbing materials contained within the one or more capsules configured to change phase through heat absorption of heat generated from inelastic deformation of the one or more tension bearing members upon release from the one or more capsules.

15. A method comprising:

constructing a cushioning element including one or more tension-bearing members, at least one of the one or more tension-bearing members being configured to stretch during a collision, including being configured to stretch beyond an elastic limit, to dissipate at least some of a kinetic energy associated with the collision, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members.

16. The method of claim 15 wherein the constructing a cushioning element including one or more tension-bearing members, at least one of the one or more tension-bearing members being configured to stretch during a collision, including being configured to stretch beyond an elastic limit, to dissipate at least some of a kinetic energy associated with the collision, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:

constructing a cushioning element including one or more tension-bearing members, the cushioning element being configured to be actuated in response to an event, at least one of the one or more tension-bearing members being configured to stretch beyond an elastic limit during a collision to convert at least some of a kinetic energy associated with the collision to thermal energy to provide cushioning support for an object.

17. The method of claim 15 wherein the constructing a cushioning element including one or more tension-bearing members, at least one of the one or more tension-bearing members being configured to stretch during a collision, including being configured to stretch beyond an elastic limit, to dissipate at least some of a kinetic energy associated with the collision, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:

constructing a cushioning element including one or more tension-bearing members and a heat capacity material associated with at least a portion of at least one of the tension-bearing members to absorb at least some of the thermal energy associated with the collision.

18. The method of claim 15 wherein the constructing a cushioning element including one or more tension-bearing members, at least one of the one or more tension-bearing members being configured to stretch during a collision, including being configured to stretch beyond an elastic limit, to dissipate at least some of a kinetic energy associated with the collision, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:

constructing a cushioning element including one or more tension-bearing member and a heat capacity material associated with at least a portion of at least one of the tension-bearing members, the heat capacity material being adapted to use a phase change to increase a capacity to have work done on the at least one of the tension bearing members.

19. The method of claim 15 wherein the constructing a cushioning element including one or more tension-bearing members, at least one of the one or more tension-bearing members being configured to stretch during a collision, including being configured to stretch beyond an elastic limit, to dissipate at least some of a kinetic energy associated with the collision, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:

constructing a cushioning element wherein the one or more heat absorbing materials contained within the one or more capsules includes one or more phase change materials to allow upon release of the one or more phase change materials from the one or more capsules for one or more phase changes to occur with the one or more phase change materials through heat absorption from the one or more tension-bearing members.

20. The apparatus of claim 1 wherein the a cushioning element, the cushioning element including one or more tension-bearing members, at least one of the one or more tension-bearing members configured to deform in response to a collision or impact, including the at least one of the one or more tension-bearing members being configured to substantially inelastically deform after reaching an elastic limit during a deformation, the cushioning element including one or more heat absorbing materials contained within one or more capsules positioned with respect to the one or more tension-bearing members to allow upon release of the one or more heat absorbing materials from the one or more capsules for heat to be absorbed from the one or more tension-bearing members via a temperature difference between the one or more heat absorbing materials and the one or more tension-bearing members comprises:
   one or more heat absorbing materials contained within the one or more capsules configured to change phase from solid to liquid through heat absorption of heat generated from deformation of the one or more tension bearing members upon release from the one or more capsules.

* * * * *

UNITED STATES PATENT AND TRADEMARK OFFICE
CERTIFICATE OF CORRECTION

Page 1 of 1

PATENT NO. : 9,321,424 B2
APPLICATION NO. : 14/297182
DATED : April 26, 2016
INVENTOR(S) : Roderick A. Hyde, Muriel Y. Ishikawa and Lowell L. Wood, Jr.

It is certified that error appears in the above-identified patent and that said Letters Patent is hereby corrected as shown below:

Title page of the patent, Item no. 73, Assignee Section: the Assignee is incorrect. "Deep Sciences, LLC" should be --Deep Science, LLC--.

Title page of the patent, Item no. 63, Related U.S. Application Data section: on the sixth line, "8,719,254" should be --8,179,254--.

Signed and Sealed this
Twenty-third Day of August, 2016

Michelle K. Lee
*Director of the United States Patent and Trademark Office*